(12) United States Patent
Yamamoto et al.

(10) Patent No.: US 12,536,776 B2
(45) Date of Patent: Jan. 27, 2026

(54) TEACHING METHOD AND TRANSFER SYSTEM FOR SUBSTRATE USING THREE-DIMENSIONAL IMAGE DATA

(71) Applicant: Tokyo Electron Limited, Tokyo (JP)

(72) Inventors: Masakazu Yamamoto, Iwate (JP); Tadashi Enomoto, Iwate (JP); Yuta Kunitake, Iwate (JP); Yutai Matsuhashi, Yamanashi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 1043 days.

(21) Appl. No.: 17/354,062

(22) Filed: Jun. 22, 2021

(65) Prior Publication Data

US 2021/0398342 A1    Dec. 23, 2021

(30) Foreign Application Priority Data

Jun. 23, 2020 (JP) ................................ 2020-107705

(51) Int. Cl.
*G06V 10/774* (2022.01)
*B25J 11/00* (2006.01)
(Continued)

(52) U.S. Cl.
CPC ......... *G06V 10/774* (2022.01); *B25J 11/0095* (2013.01); *G06F 18/214* (2023.01);
(Continued)

(58) Field of Classification Search
CPC .. G06V 10/774; G06V 10/82; G06V 2201/06; B25J 9/1692; B25J 15/0052; B25J 11/0095; G06F 18/214; G06N 3/04; G06N 3/088; G06N 20/00; G06N 3/08; G06T 15/005; G06T 15/08; G06T 15/205;
(Continued)

(56) References Cited

U.S. PATENT DOCUMENTS 7,865,316 B2 * 1/2011 Turner ............... G01N 29/0654
                                                    702/33
10,395,956 B2 * 8/2019 Yoshida ............ H01L 21/67259

FOREIGN PATENT DOCUMENTS

JP    H06203166 A  *  1/1993   ............. G06F 15/18
JP    2010056469 A *  3/2010   ....... H01L 21/67098
(Continued)

*Primary Examiner* — Andrew M Moyer
*Assistant Examiner* — Conor A O'Malley
(74) *Attorney, Agent, or Firm* — Venjuris, P.C.

(57) ABSTRACT

There is provided a teaching method for a transfer device configured to transfer a substrate between a transfer source object and a transfer destination object on which the substrate is disposable. The teaching method includes: generating three-dimensional image data of a shape of the transfer source object, a shape of the transfer destination object, and a state of the substrate based on captured image data of the transfer source object, the transfer destination object, and the substrate captured by a capturing unit, and based on design data of the transfer source object, the transfer destination object, and the substrate; and teaching the transfer device based on the three-dimensional image data so that the substrate is transferred between the transfer source object and the transfer destination object without colliding with the transfer source object and the transfer destination object.

17 Claims, 17 Drawing Sheets

(51) Int. Cl.
  *G06F 18/214* (2023.01)
  *G06N 3/04* (2023.01)
  *G06N 3/088* (2023.01)
  *G06N 20/00* (2019.01)
  *G06T 15/00* (2011.01)
  *G06T 15/08* (2011.01)
  *G06T 15/20* (2011.01)
  *G06T 17/30* (2006.01)
  *G06T 19/20* (2011.01)
  *G06V 10/82* (2022.01)

(52) U.S. Cl.
  CPC .............. *G06N 3/04* (2013.01); *G06N 3/088* (2013.01); *G06N 20/00* (2019.01); *G06T 15/005* (2013.01); *G06T 15/08* (2013.01); *G06T 15/205* (2013.01); *G06T 17/30* (2013.01); *G06T 19/20* (2013.01); *G06V 10/82* (2022.01)

(58) Field of Classification Search
  CPC ..... G06T 17/30; G06T 19/20; G06T 2200/04; G06T 2207/20081; G06T 2207/20084; G06T 7/001; G06T 7/60; H01L 21/681; H01L 21/67781
  See application file for complete search history.

(56) References Cited

FOREIGN PATENT DOCUMENTS

| | | | | |
|---|---|---|---|---|
| JP | 2015093345 A | * | 5/2015 | ............. G06T 15/20 |
| JP | 2015199155 A | * | 11/2015 | ............. B25J 9/1612 |
| JP | 2019046843 A | * | 3/2019 | ....... H01L 21/67098 |
| JP | 6568828 B2 | * | 8/2019 | ............. G05B 19/42 |

* cited by examiner

TEACHING METHOD AND TRANSFER SYSTEM FOR SUBSTRATE USING THREE-DIMENSIONAL IMAGE DATA

CROSS-REFERENCE TO RELATED APPLICATION

This application is based on and claims priority from Japanese Patent Application No. 2020-107705 filed on Jun. 23, 2020 with the Japan Patent Office, the disclosure of which is incorporated herein in its entirety by reference.

TECHNICAL FIELD

The present disclosure relates to a teaching method, a transfer system, and a storage medium that stores a program.

BACKGROUND

There is known a vertical heat treatment apparatus having a vertically extended heat treatment furnace, in which a plurality of wafers is placed on a wafer boat and accommodated in the heat treatment furnace to heat the wafers. In the vertical heat treatment apparatus, a plurality of wafers accommodated in a carrier is simultaneously transferred to a wafer boat by a wafer transfer device having a plurality of forks (see, e.g., Japanese Patent Application Laid-Open No. 2019-046843).

SUMMARY

According to an aspect of the present disclosure, there is provided a teaching method for a transfer device that transfers a substrate between a transfer source object and a transfer destination object on which the substrate is mounted. The teaching method includes: generating three-dimensional image data of a shape of the transfer source object, a shape of the transfer destination object, and a state of the substrate based on captured image data of the transfer source object, the transfer destination object, and the substrate captured by a capturing unit, and design data of the transfer source object, the transfer destination object, and the substrate; and teaching the transfer device based on the three-dimensional image data so that the substrate is transferred between the transfer source object and the transfer destination object without colliding with the transfer source object and the transfer destination object.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
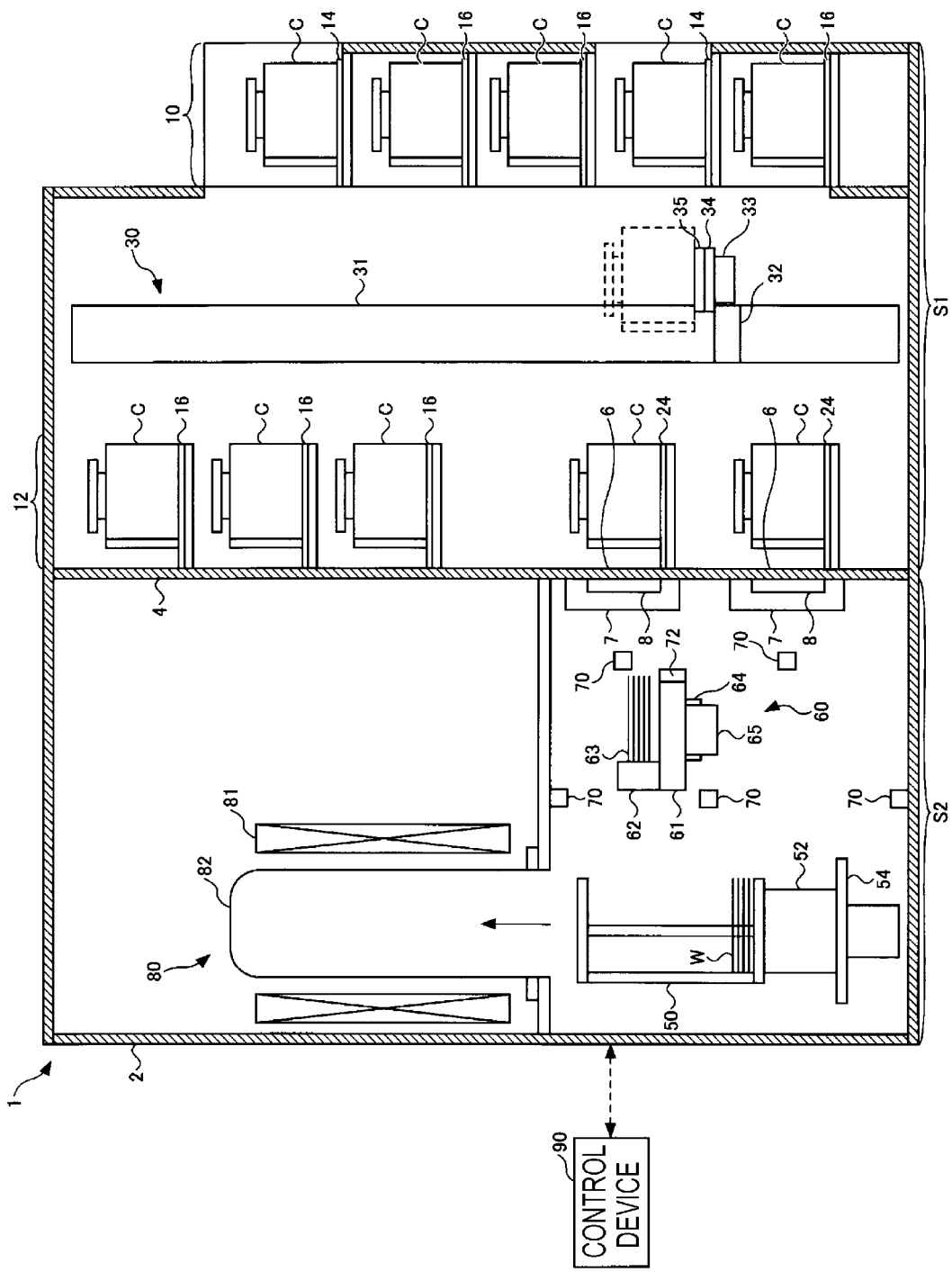
FIG. 1 is a cross-sectional view illustrating a configuration example of a substrate processing system of an embodiment.

In the following detailed description, reference is made to the accompanying drawing, which form a part thereof. The illustrative embodiments described in the detailed description, drawing, and claims are not meant to be limiting. Other embodiments may be utilized, and other changes may be made without departing from the spirit or scope of the subject matter presented here.

Hereinafter, non-limiting embodiments of the present disclosure will be described with reference to the accompanying drawings. In the accompanying drawings, the same or corresponding members or parts are denoted by the same or corresponding reference numerals, and redundant explanations thereof are omitted.

<System Configuration>

Figure 2:
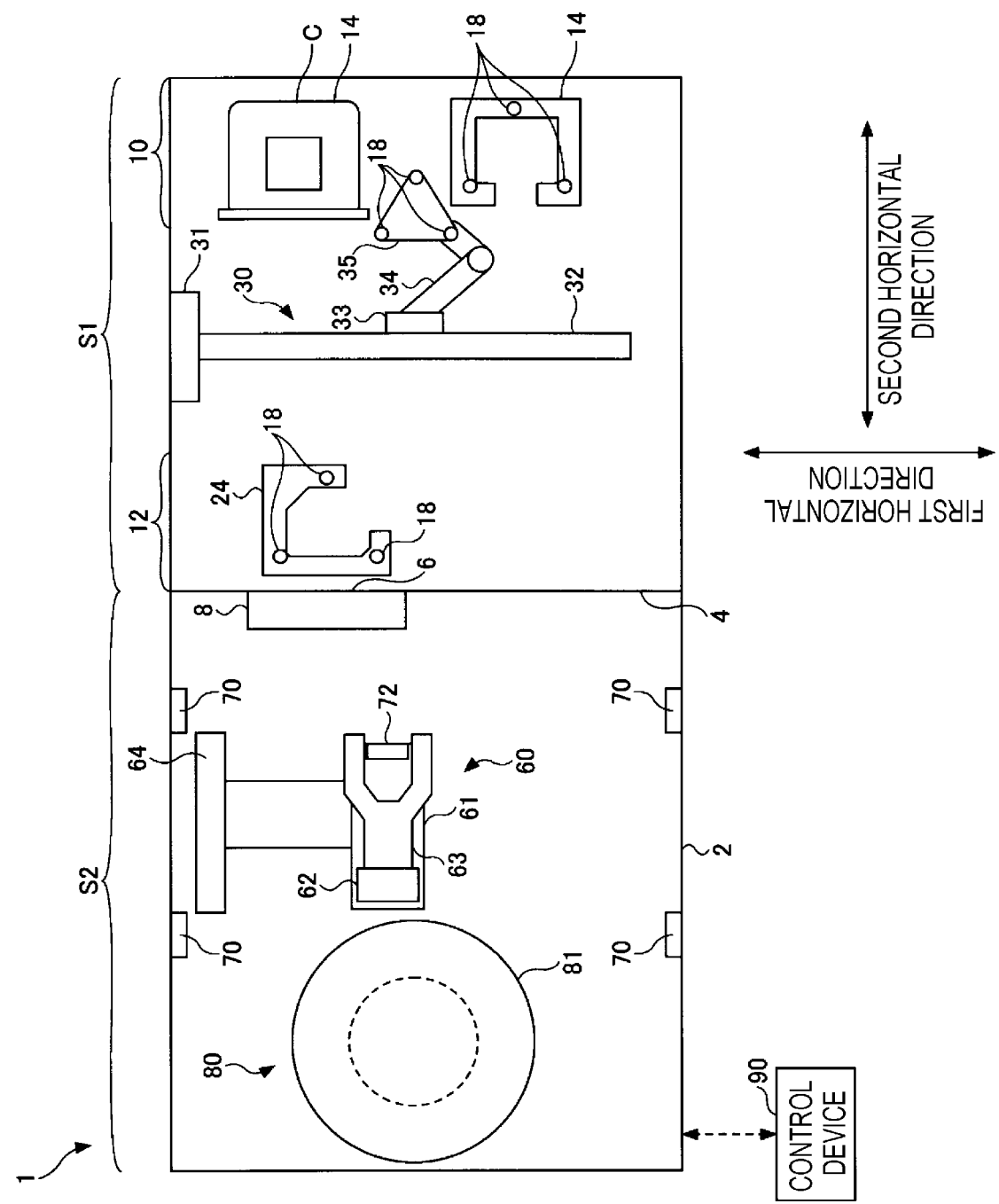
FIG. 2 is a cross-sectional view illustrating a configuration example of the substrate processing system of the embodiment.

FIGS. 1 and 2 are a cross-sectional view and a plan view illustrating a configuration example of a substrate processing system of an embodiment, respectively. As illustrated in FIG. 1, the substrate processing system includes a substrate processing apparatus 1 and a control device 90. The substrate processing apparatus 1 performs a predetermined process (e.g., heat treatment) on a semiconductor wafer (hereinafter, referred to as a wafer W) which is an example of a substrate. The control device 90 controls the entire substrate processing apparatus 1.

The substrate processing apparatus 1 is accommodated in a housing 2 that constitutes an exterior body of the apparatus. A carrier transfer region S1 and a wafer transfer region S2 are formed in the housing 2. The carrier transfer region S1 and the wafer transfer region S2 are partitioned by a partition wall 4. The partition wall 4 is provided with a transfer port 6 for communicating the carrier transfer region S1 and the wafer transfer region S2 and transferring the wafer W.

The transfer port 6 is opened and closed by a door mechanism 8 in accordance with the front-opening interface mechanical standard (FIMS). A driving mechanism of a cover opening/closing device 7 is connected to the door mechanism 8. The door mechanism 8 is configured to be movable in the forward and backward direction and the vertical direction by the driving mechanism, and the transfer port 6 is opened/closed.

Hereinafter, the arrangement direction of the carrier transfer region S1 and the wafer transfer region S2 is defined as the forward and backward direction (corresponding to a second horizontal direction in FIG. 2), and the horizontal direction perpendicular to the forward and backward direction is defined as the left and right direction (corresponding to a first horizontal direction in FIG. 2).

The carrier transfer region S1 is a region under an atmosphere. The carrier transfer region S1 is a region in which a carrier C in which the wafer W is accommodated is transferred between the elements (to be described later) in the substrate processing apparatus 1, is loaded into the substrate processing apparatus 1 from the outside, or unloaded from the substrate processing apparatus 1 to the outside. As for the carrier C, for example, a front-opening unified pod (FOUP) may be used. By maintaining the cleanliness in the FOUP at a predetermined level, it is possible to prevent foreign matters from adhering to the surface of the wafer W and a natural oxide film from being formed. The carrier transfer region S1 is constituted by a first transfer region 10 and a second transfer region 12, which is located behind the first transfer region 10 (the wafer transfer region S2 side).

As an example, the first transfer region 10 illustrated in FIGS. 1 and 2 is provided with two load ports 14 in the upper and lower stages and two load ports 14 on the left and right sides of each stage. The load port 14 is a loading stand for receiving the carrier C when the carrier C is loaded into the substrate processing apparatus 1. The load port 14 is provided at a place where the wall of the housing 2 is opened, and the substrate processing apparatus 1 may be accessed from the outside. Specifically, loading and placement of the carrier C onto the load port 14 and unloading of the carrier C from the load port 14 to the outside may be performed by a transfer device (not illustrated) provided outside the substrate processing apparatus 1.

Further, since the load port 14 exists in two stages, for example, upper and lower stages, the carrier C may be loaded and unloaded into and from both. A stocker 16 may be provided in the lower stage of the load port 14 in order to store the carrier C. Positioning pins 18 for positioning the carrier C are provided at, for example, three locations on the surface of the load port 14 on which the carrier C is placed. Further, the load port 14 may be configured to be movable in the forward and backward direction at a state where the carrier C is placed on the load port 14.

Two FIMS ports 24 (see, e.g., FIG. 1) are arranged side by side vertically in a lower part of the second transfer region 12. The FIMS port 24 is a holding table that holds the carrier C when the wafer W in the carrier C is loaded into and unloaded from a heat treatment furnace 80 (to be described later) in the wafer transfer region S2. The FIMS port 24 is configured to be movable in the forward and backward direction. Similar to the load port 14, positioning pins 18 for positioning the carrier C are provided at three locations on the surface of the FIMS port 24 on which the carrier C is placed.

Further, a stocker 16 is provided above the second transfer region 12 to store the carrier C. The stocker 16 is constituted by, for example, three shelves. Two or more carriers C may be placed on each shelf of the stocker 16 in the left and right direction. Further, the stocker 16 may be placed even in the lower part of the second transfer region 12 where a carrier stand is not placed.

A carrier transfer mechanism 30 is provided between the first transfer region 10 and the second transfer region 12 to transfer the carrier C among the load port 14, the stocker 16, and the FIMS port 24. The carrier transfer mechanism 30 includes a first guide 31, a second guide 32, a moving portion 33, an arm portion 34, and a hand portion 35. The first guide 31 is configured to extend in the vertical direction. The second guide 32 is connected to the first guide 31 and is configured to extend in the left and right direction (i.e., the first horizontal direction). The moving portion 33 is configured to move in the left and right direction while being guided by the second guide 32. The arm portion 34 includes one joint and two arm portions, and is provided on the moving portion 33. The hand portion 35 is provided at the tip of the arm portion 34. The hand portion 35 is provided with pins 18 for positioning the carrier C at three locations.

The wafer transfer region S2 is a region in which the wafer W is taken out from the carrier C to perform various processes thereon. The wafer transfer region S2 has an inert gas atmosphere, for example, a nitrogen gas atmosphere in order to suppress the formation of an oxide film on the wafer W. A vertical heat treatment furnace 80 having a lower end opened as a furnace opening is provided in the wafer transfer region S2.

The heat treatment furnace 80 may accommodate the wafer W and has a cylindrical processing container 82 made of quartz for heat-treating the wafer W. A cylindrical heater 81 is arranged around the processing container 82. The wafer W accommodated in the processing container 82 is subjected to heat treatment by heating the heater 81. A shutter (not illustrated) is provided below the processing container 82. The shutter is a door that covers the lower end of the heat treatment furnace 80 until the wafer boat 50 is unloaded from the heat treatment furnace 80 and the next wafer boat 50 is loaded. Below the heat treatment furnace 80, a wafer boat 50, which is a substrate holder, is placed on a lid 54 via a heat insulating cylinder 52. In other words, the lid 54 is integrally provided with the wafer boat 50 below the wafer boat 50.

The wafer boat 50 is made of, for example, quartz, and is configured to hold the wafer W having a large diameter (e.g., a diameter of 300 mm or 450 mm) substantially horizontally with a predetermined interval in the vertical direction. The number of the wafers W accommodated in the wafer boat 50 is not particularly limited but is, for example, 50 sheets to 200 sheets. The lid 54 is supported by an elevating mechanism (not illustrated), and the wafer boat 50 is loaded or unloaded for the heat treatment furnace 80 by the elevating mechanism. A wafer transfer device 60 is provided between the wafer boat 50 and the transfer port 6.

The wafer transfer device 60 transfers the wafer W between the carrier C held on the FIMS port 24 and the wafer boat 50. The wafer transfer device 60 includes a guide mechanism 61, a moving body 62, a fork 63, an elevating mechanism 64, and a rotation mechanism 65. The guide mechanism 61 has a rectangular parallelepiped shape. The guide mechanism 61 is attached to the elevating mechanism 64 that extends in the vertical direction, and may be moved in the vertical direction by the elevating mechanism 64 and may be rotated by the rotation mechanism 65.

Further, the moving body 62 is provided on the guide mechanism 61 to be able to move forward and backward along the longitudinal direction. The fork 63 is a transfer apparatus attached via the moving body 62, and a plurality of (e.g., five) forks 63 are provided. Since the wafer transfer device 60 having a plurality of forks 63 may transfer a plurality of wafers W at the same time, the time required for transferring the wafers W may be shortened. The number of forks 63 may be one.

A filter unit (not illustrated) may be provided on the ceiling or the side wall of the wafer transfer region S2. Examples of the filter unit include a high efficiency particulate air (HEPA) filter and an ultra-low penetration air (ULPA) filter. By providing the filter unit, clean air may be supplied to the wafer transfer region S2.

One or more cameras 70 are provided on the ceiling, the side wall, or the floor of the wafer transfer region S2. Further, the wafer transfer device 60 is provided with one or more cameras 72. The camera 72 is installed in the movable part of the wafer transfer device 60. The camera 72 installed in the movable part of the wafer transfer device 60 may capture an image with higher accuracy than, for example, the camera 70. As will be described later, the cameras 70 and 72 capture the shape of the carrier C held on the FIMS port 24 (e.g., the shape of a wafer mounting position) and the shape of the wafer boat 50 (e.g., the overall shape and the shape of a wafer mounting position). The installation positions of the cameras 70 and 72 illustrated in FIGS. 1 and 2 are examples.

The control device 90 controls the entire substrate processing apparatus 1. The control device 90 controls the operation of various apparatuses in the substrate processing apparatus 1 so that heat treatment is performed under the various processing conditions represented in the recipe. As will be described later, the control device 90 executes a process of automatically detecting the shape of the carrier C and the shape of the wafer boat 50 held on the FIMS port 24. Further, as will be described later, the control device 90 executes a fully automatic teaching process that automates the teaching of the wafer transfer device 60 by using deep learning, which is an example of machine learning, an autonomous automatic transfer process that autonomously controls the transfer of the wafer W by the wafer transfer device 60, and a maintenance execution prediction process that supports preventive maintenance activities of the wafer transfer device 60.

<Hardware Configuration>

Figure 3:
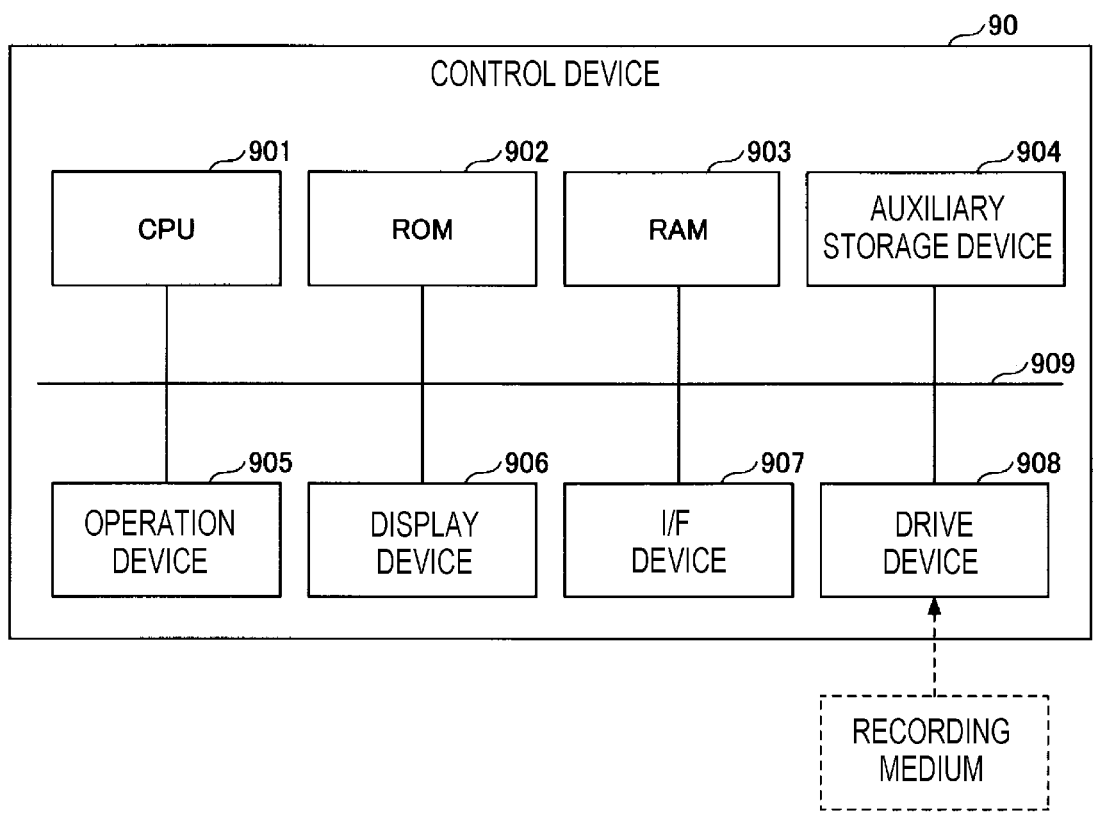
FIG. 3 is a diagram illustrating an example of a hardware configuration of a control device.

An example of a hardware configuration of the control device 90 will be described with reference to FIG. 3. FIG. 3 is a diagram illustrating an example of the hardware configuration of the control device.

The control device 90 includes a central processing unit (CPU) 901, a read only memory (ROM) 902, and a random access memory (RAM) 903. The CPU 901, the ROM 902, and the RAM 903 constitute a so-called computer. The control device 90 also includes an auxiliary storage device 904, an operation device 905, a display device 906, an interface (I/F) device 907, and a drive device 908. The hardware of the control device 90 is connected to each other via a bus 909.

The CPU 901 expands and executes various programs installed in the auxiliary storage device 904. The ROM 902 is a non-volatile memory and functions as a main storage device. The ROM 902 stores various programs and data necessary for the CPU 901 to execute the various programs installed in the auxiliary storage device 904.

The RAM 903 is a volatile memory such as a dynamic random access memory (DRAM) or a static random access memory (SRAM), and functions as a main storage device. The RAM 903 provides a work area that is expanded when the various programs installed in the auxiliary storage device 904 are executed by the CPU 901.

The auxiliary storage device 904 stores various programs, three-dimensional image data acquired by the various programs being executed by the CPU 901, captured image data, and teaching data. Further, the auxiliary storage device 904 stores design data of the substrate processing apparatus 1 used by various programs. The design data is, for example, three-dimensional CAD data.

The operation device 905 is an input device used when the user inputs various instructions to the control device 90. The display device 906 is a display device that displays internal information of the control device 90. The I/F device 907 is a connection device for connecting to a communication line (not illustrated) and communicating with a substrate processing apparatus 1 and a host computer (not illustrated).

The drive device 908 is a device that sets a recording medium. The recording medium includes a medium that records information optically, electrically, or magnetically, such as a CD-ROM, a flexible disk, or a magneto-optical disk. Further, the recording medium may include a semiconductor memory that electrically records information, such as a ROM or a flash memory.

The various programs installed in the auxiliary storage device 904 are installed, for example, by setting the distributed recording medium in the drive device 908 and reading the various programs recorded in the recording medium by the drive device 908. Further, various programs installed in the auxiliary storage device 904 may be installed by being downloaded from a server such as a cloud.

<Functional Configuration>

Figure 4:
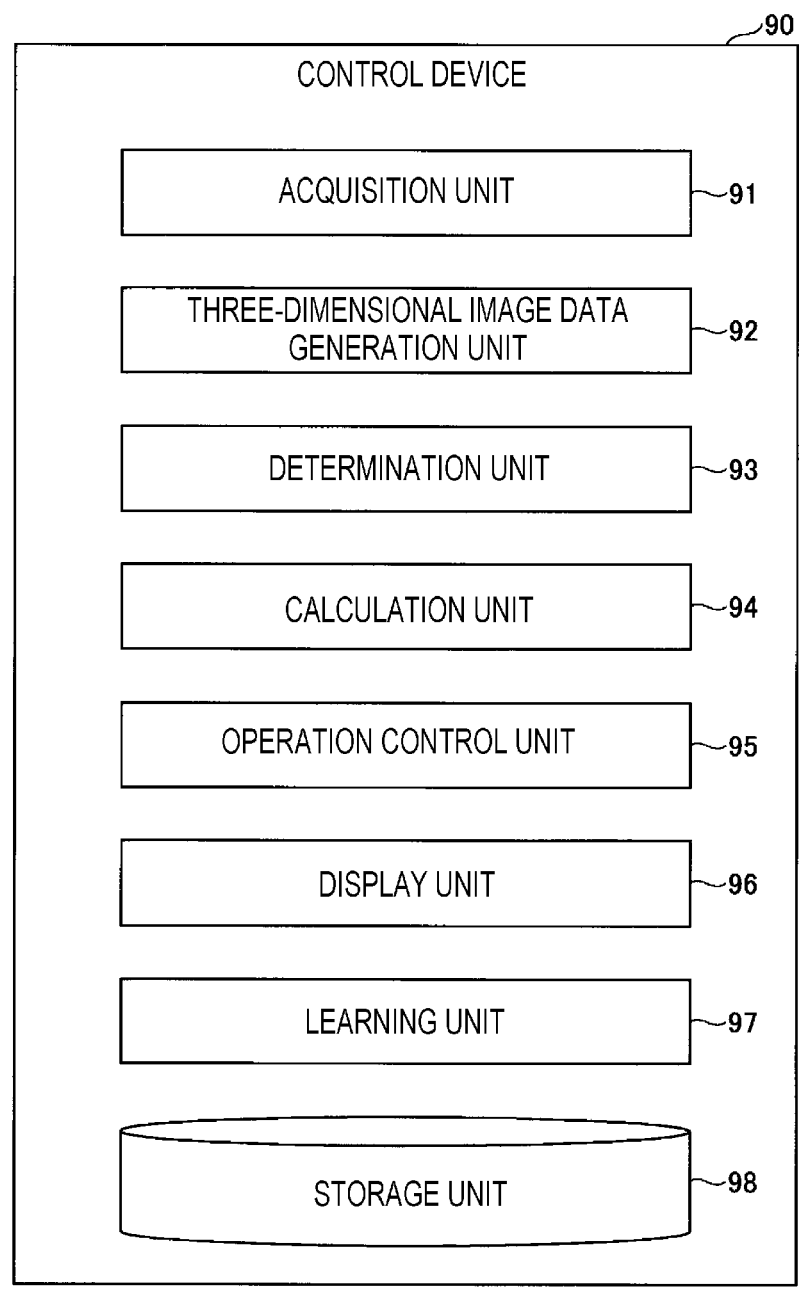
FIG. 4 is a diagram illustrating an example of a functional configuration of the control device.

An example of a hardware configuration of the control device 90 will be described with reference to FIG. 4. FIG. 4 is a diagram illustrating an example of a functional configuration of the control device 90. The control device 90 includes an acquisition unit 91, a three-dimensional image data generation unit 92, a determination unit 93, a calculation unit 94, an operation control unit 95, a display unit 96, a learning unit 97, and a storage unit 98.

The acquisition unit 91 acquires various types of data. In the embodiment, the acquisition unit 91 acquires captured image data from the cameras 70 and 72. In addition, the acquisition unit 91 acquires design data of the substrate processing apparatus 1. The acquisition unit 91 also acquires three-dimensional measurement data such as the shape of the wafer boat 50.

Further, the acquisition unit 91 may acquire the fork interval data measured by fork scanning and the wafer interval data measured by boat scanning. The various types of data acquired by the acquisition unit 91 may be data stored in the storage unit 98, or may be data stored in a server connected to enable data communication via a network.

The three-dimensional image data generation unit 92 generates the three-dimensional image data inside the substrate processing apparatus 1 including the wafer boat 50, the carrier C, and the wafer W based on the captured image data and the design data acquired by the acquisition unit 91 as described later. The generated three-dimensional image data is used to create a three-dimensional image inside the substrate processing apparatus 1 in a virtual space (cyber space) by using the digital twin technology.

The three-dimensional image data generation unit 92 may perform a deep learning based on the captured image data inside the substrate processing apparatus 1 acquired in the past, and sharpen the three-dimensional image data by image processing using the model that has performed deep learning.

The sharpening of three-dimensional image data by image processing using a model that has performed deep learning refers to a process of improving the determination accuracy of each measurement position in a learning flow for simultaneously learning images viewed from the same position on three-dimensional image data generated based on the design data of the substrate processing apparatus 1, and a flow during actual operation when deep learning is performed with the captured image data taken inside the substrate processing apparatus 1.

For example, in the learning flow, as a first process, various mechanical operation states during the transfer of the wafer W are captured. Further, in the learning flow, as a second process, the same mechanical operation state as the first process on the three-dimensional image data generated based on the design data is reproduced, and the image data viewed from the same position is generated.

As a third process, in both the captured image data captured in the first process and the image data generated in the second process, after teaching various measurement positions for both the captured image data of the first process and the image data of the second process, machine learning is performed by combining the captured image data of the first process and the image data of the second process.

Then, the machine learning processes of the first to third processes are performed in various mechanical operation states, and the teaching is repeated for the deep learning model. According to such a process, it is possible to reduce erroneous determination and improve the accuracy when determining each measurement position.

For example, in the flow during actual operation, as a first process, various mechanical operation states during the transfer of the wafer W are captured. Further, in the learning flow, as a second process, the same mechanical operation state as the first process on the three-dimensional image data generated based on the design data is reproduced, and the image data viewed from the same position is generated.

As a third process, various measurement positions may be determined by inputting the captured image data taken in the first process and the image data generated in the second process into a model subjected to deep learning.

The determination unit 93 performs various determinations based on the various types of data acquired by the acquisition unit 91 and the three-dimensional image data generated by the three-dimensional image data generation unit 92. In the embodiment, the determination unit 93 determines whether a clearance dimension between the wafer boat 50 or the carrier C and the wafer W to be transferred is within a predetermined range. The clearance dimension is a gap made not to come into contact with each other.

Further, the determination unit 93 may determine that the components are erroneously installed (e.g., the wafer boat 50 is erroneously installed) and that the components are distorted, tilted, or missing by comparing the three-dimensional image data generated from the design data with the three-dimensional image data generated from the captured image data (superimposing the data to measure the amount of deviation (machine difference) from the design value).

The calculation unit 94 performs various calculations. In the embodiment, the calculation unit 94 performs a clearance dimension measurement of the wafer boat 50, the carrier C, and the wafer W being transferred in real time based on various data acquired by the acquisition unit 91 and the three-dimensional image data generated by the three-dimensional image data generation unit 92. Based on the measurement result of the clearance dimension, the calculation unit 94 calculates the teaching data of the wafer transfer device 60 that may transfer the wafer W without the wafer boat 50, the carrier C, and the wafer W being transferred colliding with each other.

The operation control unit 95 controls the operation of each unit of the substrate processing apparatus 1, for example, the operation of the wafer transfer device 60 according to the teaching data. In the embodiment, the operation control unit 95 operates the wafer transfer device 60 according to the teaching data to transfer the wafer W between the carrier C and the wafer boat 50. Further, the operation control unit 95 operates the wafer transfer device 60 to control the position and the capturing direction of the camera 72 installed in the movable part of the wafer transfer device 60.

Further, the operation control unit 95 may operate the wafer transfer device 60 to execute the fork scanning. The fork scanning is an operation of measuring the position information of the wafer transfer device 60 by, for example, an optical sensor (not illustrated). The position information of the wafer transfer device 60 includes, for example, a fork interval which is a distance between adjacent forks in a plurality of forks 63 of the wafer transfer device 60, and a fork angle which is an angle of each fork 63 with respect to a moving body 62. The optical sensor may be, for example, a transmission type optical sensor or a reflection type optical sensor provided in the wafer transfer region S2.

Further, the operation control unit 95 may operate the wafer transfer device 60 to execute the boat scanning. The three-dimensional measurement data is created by, for example, a boat scanning. The boat scanning is an operation of measuring the position information of the wafer boat 50 by, for example, an optical sensor (not illustrated) attached to the fork 63 of the wafer transfer device 60.

The display unit 96 generates various types of information to be displayed on the display device 906. The learning unit 97 acquires data necessary for deep learning such as captured image data acquired by the acquisition unit 91, design data, and a plurality of past teaching data pieces (including evaluation of the teaching data) for the wafer transfer device 60. The learning unit 97 generates a neural network (model) that calculates the optimum teaching data for wafer transfer by deep learning based on the acquired data.

For example, the learning unit 97 uses the teaching data for deep learning by dividing it into high-evaluation teaching data that is continuously used without accidents for a predetermined period (e.g., one year) and low-evaluation teaching data that causes an accident or is poorly adjusted and requires re-teaching. As the plurality of past teaching data pieces for the wafer transfer device 60, not only the past teaching data of the substrate processing apparatus 1 to be taught but also the teaching data of another substrate processing apparatus 1 of the same type may be used.

The storage unit 98 stores various types of data. Examples of various data include design data, captured image data, three-dimensional measurement data, learning data for deep learning, model data, and determination data. The model data includes a model generated by deep learning by the learning unit 97, for example, a neural network. The determination data includes various data necessary for determination by the determination unit 93.

<Process>

Hereinafter, descriptions will be made on a fully automatic teaching process that automates the teaching of the wafer transfer device 60 for transferring the wafer W between the wafer boat 50 and the FOUP, which is an example of the carrier C, an autonomous automatic transfer process that autonomously controls the transfer of the wafer W by the wafer transfer device 60, and a maintenance execution prediction process that supports preventive maintenance activities of the wafer transfer device 60. Further, the fully automatic teaching process, autonomous automatic transfer process, and maintenance execution prediction process of the wafer transfer device 60 are largely based on machine learning, but it is important to accurately grasp the shape of the wafer boat 50 and the shape of the FOUP used for machine learning.

Therefore, descriptions will be made here on a data collection method for the shapes of the wafer boat 50 and the FOUP used for deep learning, which is an example of machine learning, and a fully automatic teaching process, autonomous automatic transfer process, and maintenance execution prediction process of the wafer transfer device 60 based on the data collected by the data collection method.

<<Utilization of Three-Dimensional Measurement Data>>

Figure 5:
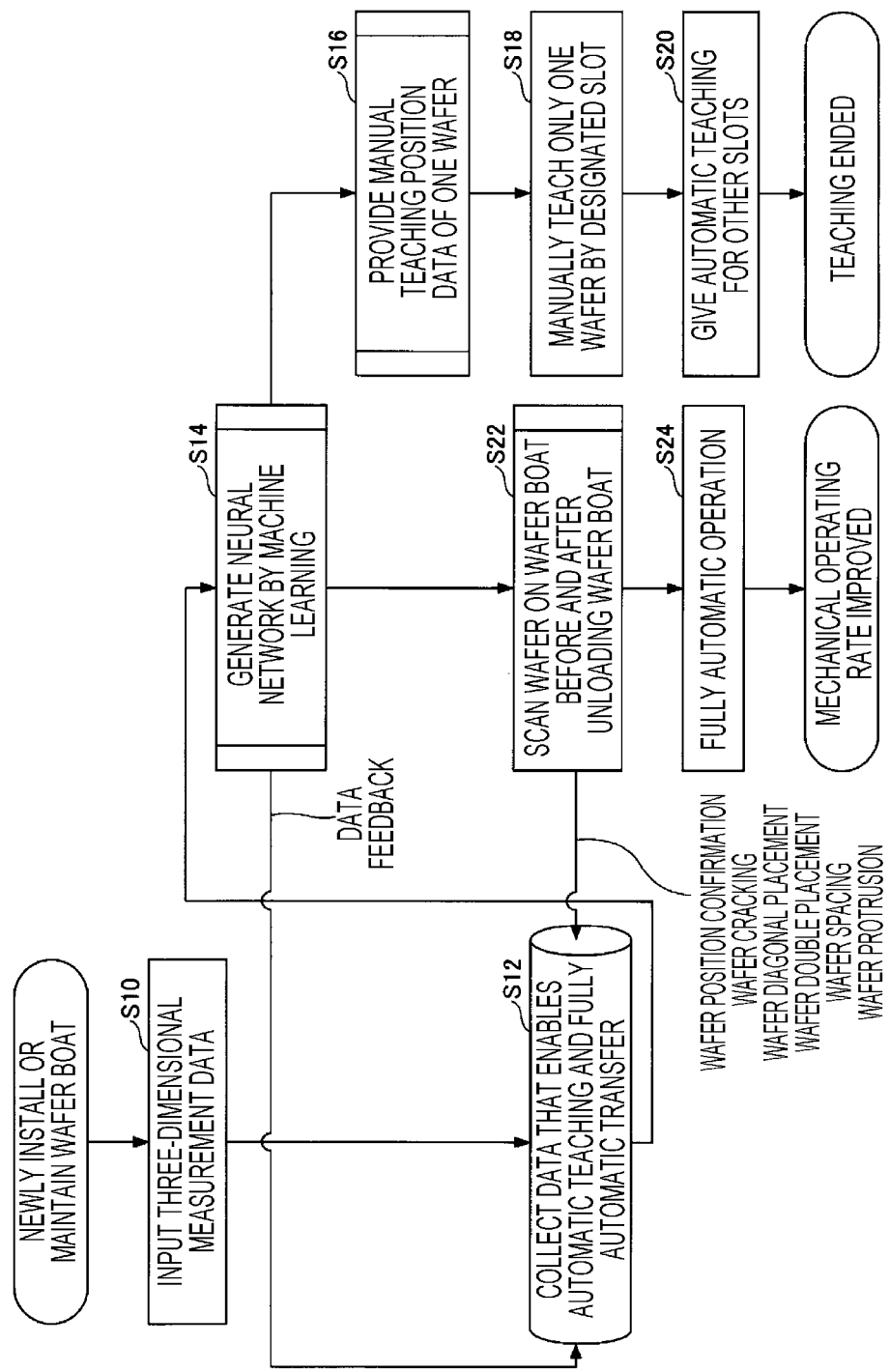
FIG. 5 is a flowchart of an example of processing utilizing three-dimensional measurement data.

The control device 90 performs a fully automatic teaching process, autonomous automatic transfer process, and maintenance execution prediction process of the wafer transfer device 60 based on the shapes of the wafer boat 50 and the FOUP which are detected by the procedure illustrated in, for example, FIG. 5. FIG. 5 is a flowchart of an example of processing utilizing three-dimensional measurement data.

In step S10, the three-dimensional measurement data of the wafer boat 50, the FOUP, and the wafer transfer device 60 is input to the control device 90. In step S12, the control device 90 collects data that includes the three-dimensional measurement data input in step S10 and enables automatic teaching and fully automatic transfer, and stores the data in the storage unit 98.

Examples of the data that enables automatic teaching and fully automatic transfer include the position information obtained by the above-mentioned sharpening of the three-dimensional image data, the transfer position in the design value based on the design information from the three-dimensional CAD data, and the position information corrected by machine learning that has learned the teaching position of an expert. Further, the data that enables automatic teaching and fully automatic transfer includes, for example, the positions of the wafer boat 50 and the fork 63 obtained by the fork scanning and the boat scanning, the transfer statistical data, and the teaching position information. The data that enables automatic teaching and fully automatic transfer include, for example, mixed three-dimensional image data that combines the three-dimensional image data generated based on the captured image data and design data of various mechanical operation states during transfer of the wafer W in the process of sharpening the three-dimensional image data by image processing by the model subjected to the above deep learning.

The storage unit 98 stores the three-dimensional measurement data of the previous wafer boat 50 attached to the substrate processing apparatus 1 and the three-dimensional measurement data of the existing wafer boat 50 attached to the substrate processing apparatus 1.

In step S14, the control device 90 generates a neural network that calculates the optimum teaching data for wafer transfer by machine learning based on the data that includes the input three-dimensional measurement data and enables automatic teaching and fully automatic transfer.

In step S16, the maintenance person (worker) calls a function for teaching to the wafer transfer device 60. In step S18, the worker operates the wafer transfer device 60 to teach at least one slot (designated slot) on the wafer boat 50, and stores the teaching data in the storage unit 98. The slot may be an arbitrary slot on the wafer boat 50, for example, in the bottom, top, and middle periphery on the wafer boat 50.

In step S20, the control device 90 generates teaching data for all slots based on the teaching data of at least one slot on the wafer boat 50 stored in the storage unit 98 and the neural network, and stores the teaching data in the storage unit 98.

In steps S22 and S24, the control device 90 operates the wafer transfer device 60 based on the teaching data stored in the storage unit 98 in steps S18 and S20 to transfer the wafer W from the carrier C of the transfer source to the wafer boat 50 of the transfer destination. The control device 90 scans the wafer W on the wafer boat 50 before loading the wafer boat 50 into the heat treatment furnace 80 and after unloading the wafer boat 50 from the heat treatment furnace 80.

As a result, the control device 90 may measure data such as wafer position confirmation, wafer cracking, wafer diagonal placement, wafer double placement, wafer spacing, and wafer protrusion, and in associated with the teaching data at that time, store such data in the storage unit 98 as data that enables automatic teaching and fully automatic transfer in step S12. Further, the neural network generated in step S14 may be fed back to various data stored in the storage unit 98. In this way, the control device 90 may control the operation of the wafer transfer device 60 based on the optimum teaching data calculated by machine learning, and may autonomously control the transfer of the wafer W.

<<Utilization of Captured Image Data of Camera 72>>

Figure 6:
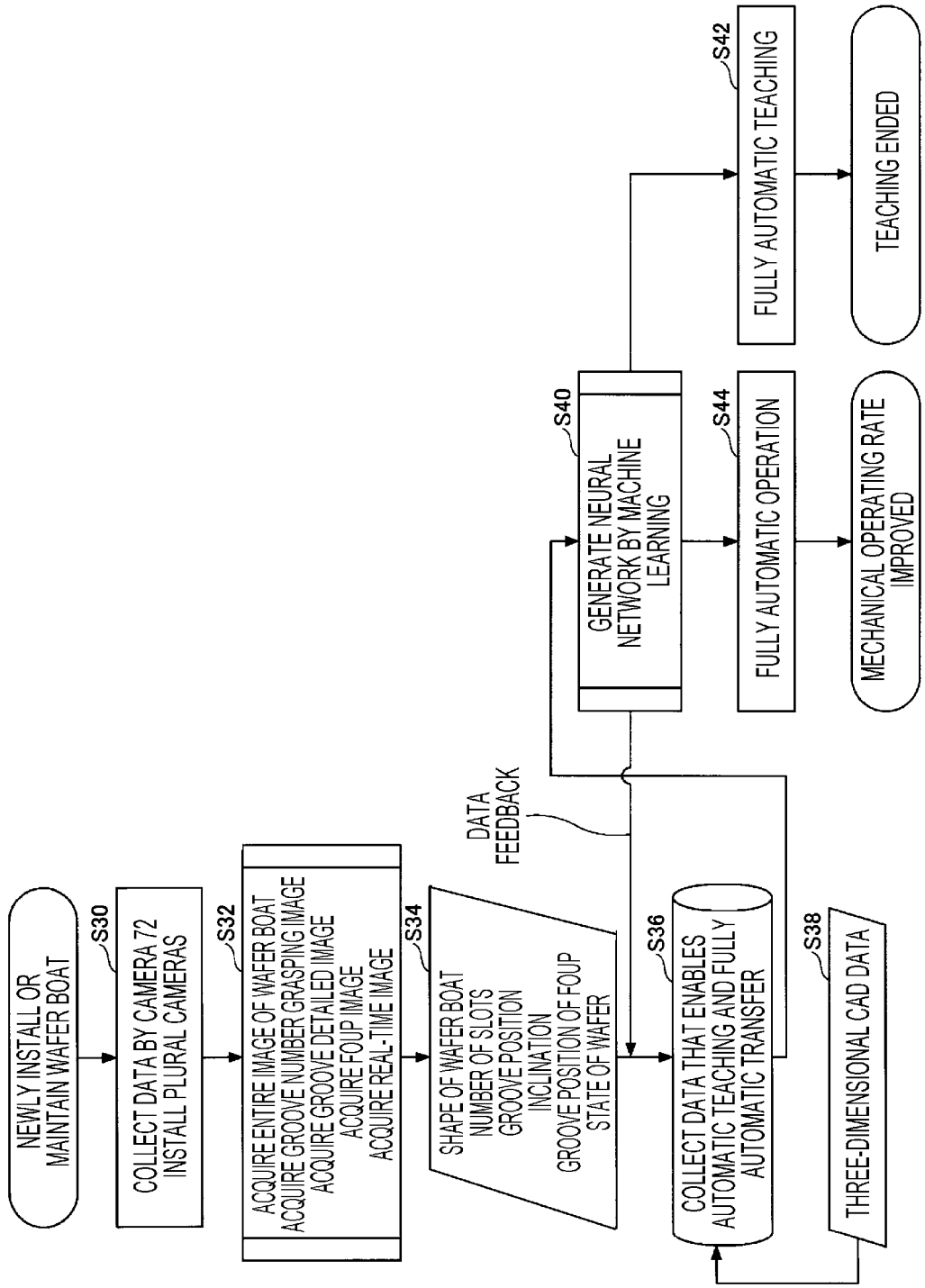
FIG. 6 is a flowchart of an example of processing utilizing a camera 72.

The control device 90 performs a fully automatic teaching process, autonomous automatic transfer process, and maintenance execution prediction process of the wafer transfer device 60 based on the shapes of the wafer boat 50 and the FOUP which are detected by the procedure illustrated in, for example, FIG. 6. FIG. 6 is a flowchart of an example of processing utilizing a camera 72.

In step S30, the control device 90 collects data by the camera 72. For example, the control device 90 uses a polarizing plate to detect the polarized light (groove portion) due to the difference in the thickness of quartz of the wafer boat 50, thereby capturing the groove shape of the wafer boat 50. Further, the control device 90 captures the shapes of the wafer boat 50 and the FOUP in the visible light region. By installing a plurality of cameras 72, the shape of the wafer boat 50 may be grasped and the distance measurement accuracy may be improved. The camera 72 may utilize a wide-angle lens.

In step S32, the control device 90 acquires the entire image of the wafer boat 50, the groove number grasping image, the groove detailed image, the FOUP image, and the real-time image from the data collected in step S30.

In step S34, the control device 90 performs an image processing on the entire image of the wafer boat 50, the groove number grasping image, the groove detailed image, the FOUP image, and the real-time image which are acquired in step S32, thereby measuring the shape of the wafer boat 50, the number of slots, the groove position, the inclination, the groove position of the FOUP, and the state of the wafer W. The state of the wafer W represents data such as the position, cracking, diagonal placement, double placement, spacing, and protrusion of the wafer W on the wafer boat 50. Since the details of the image processing in step S34 have been described in the above-mentioned process of "sharpening of three-dimensional image data by image processing by a model subjected to deep learning," the description here will be omitted.

In step S36, the control device 90 collects data that includes the data measured in step S34 and enables an automatic teaching and a fully automatic transfer, and stores the data in the storage unit 98. In step S38, the control device 90 may store the three-dimensional CAD data, which is an example of the design data, in the storage unit 98 as data that enables the automatic teaching and the fully automatic transfer.

The storage unit 98 stores data that enables the automatic teaching and the fully automatic transfer of the previous wafer boat 50 attached to the substrate processing apparatus 1, and data that enables the automatic teaching and the fully automatic transfer of the existing wafer boat 50 attached to the substrate processing apparatus 1.

In step S40, the control device 90 generates a neural network that calculates the optimum teaching data for wafer transfer by machine learning based on the data stored in the storage unit 98 that enables the automatic teaching and the fully automatic transfer.

In step S42, the control device 90 generates teaching data for all slots based on the neural network and the data that enable the automatic teaching and the fully automatic transfer stored in the storage unit 98, and stores the teaching data in the storage unit 98. In step S44, the control device 90 operates the wafer transfer device 60 based on the teaching data stored in the storage unit 98 in step S42 to transfer the wafer W between the wafer boat 50 and the FOUP.

Further, the neural network generated in step S40 may be fed back to various data stored in the storage unit 98. In this way, the control device 90 may control the operation of the wafer transfer device 60 based on the optimum teaching data calculated by machine learning, and may autonomously control the transfer of the wafer W.

<<Utilization of Captured Image Data of Camera 70>>

Figure 7:
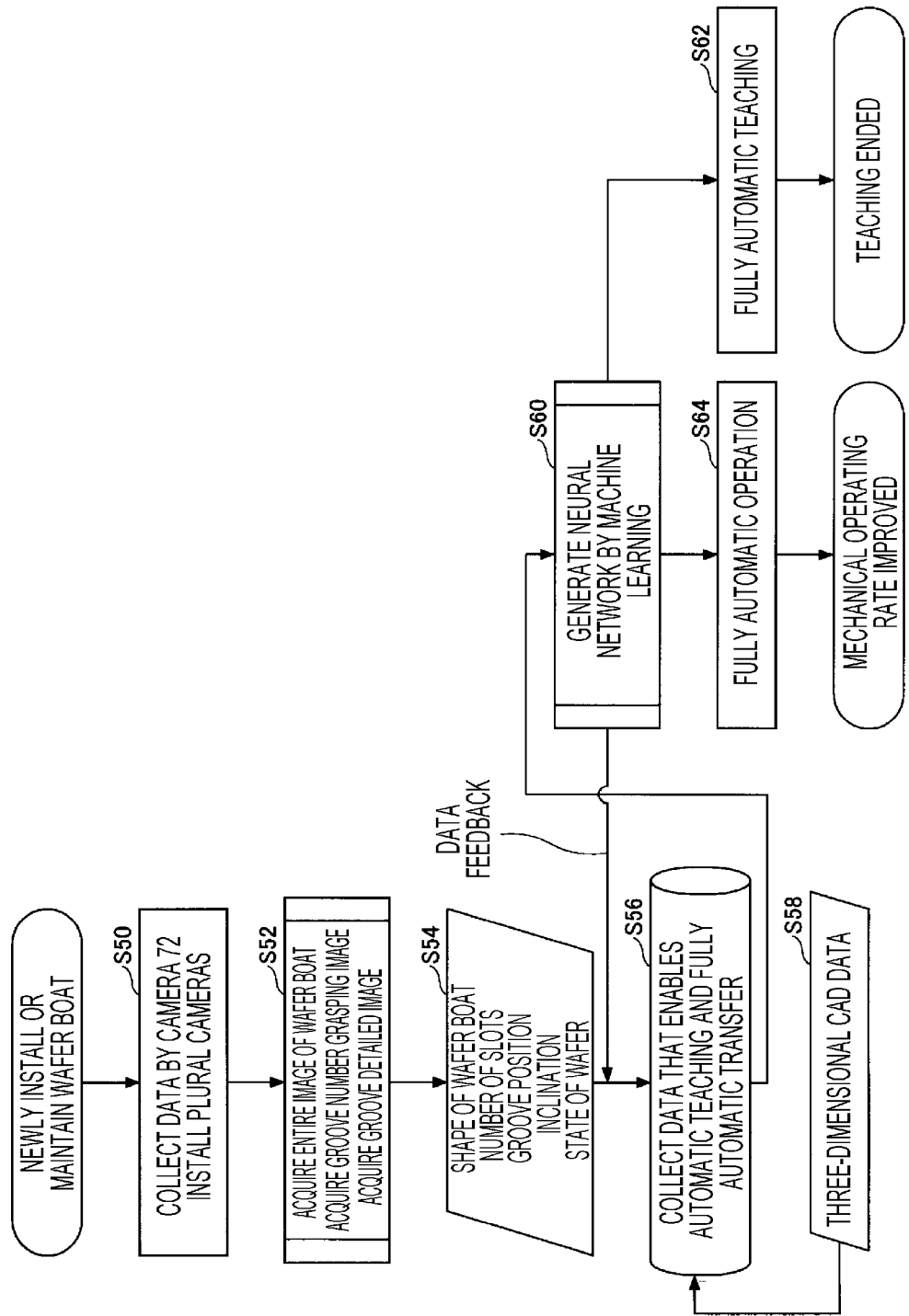
FIG. 7 is a flowchart of an example of processing utilizing a camera 70.

The control device 90 performs a fully automatic teaching process, autonomous automatic transfer process, and maintenance execution prediction process of the wafer transfer device 60 based on the shapes of the wafer boat 50 and the FOUP which are detected by the procedure illustrated in, for example, FIG. 7. FIG. 7 is a flowchart of an example of processing utilizing a camera 70.

In step S50, the control device 90 collects data by the camera 70. For example, the control device 90 uses a polarizing plate to detect the polarized light (groove portion) due to the difference in the thickness of quartz of the wafer boat 50, thereby capturing the groove shape of the wafer boat 50. Further, the control device 90 utilizes a wide-angle lens to capture the entire shape of the wafer boat 50. By installing a plurality of cameras 70, the shape of the wafer boat 50 may be grasped and the distance measurement accuracy may be improved.

In step S52, the control device 90 acquires the entire image of the wafer boat 50, the groove number grasping image, the groove detailed image, the FOUP image, and the real-time image from the data collected in step S50. In step S54, the control device 90 performs an image processing on the entire image of the acquired wafer boat 50, the groove number grasping image, and the groove detailed image, thereby measuring the shape of the wafer boat 50, the number of slots, the groove position, the inclination, and the state of the wafer W. The state of the wafer W represents data such as the position of the wafer W, cracking, diagonal placement, double placement, spacing, and protrusion on the wafer boat 50.

In step S56, the control device 90 collects data that includes the data measured in step S54 and enables an automatic teaching and a fully automatic transfer, and stores the data in the storage unit 98. In step S58, the control device 90 may store the three-dimensional CAD data, which is an example of the design data, in the storage unit 98 as data that enables the automatic teaching and the fully automatic transfer.

The storage unit 98 stores data that enables the automatic teaching and the fully automatic transfer of the previous wafer boat 50 attached to the substrate processing apparatus 1, and data that enables the automatic teaching and the fully automatic transfer of the existing wafer boat 50 attached to the substrate processing apparatus 1.

In step S60, the control device 90 generates a neural network that calculates the optimum teaching data for wafer transfer by machine learning based on the data stored in the storage unit 98 that enables the automatic teaching and the fully automatic transfer.

In step S62, the control device 90 generates teaching data for all slots based on the neural network and the data that enables the automatic teaching and the fully automatic transfer stored in the storage unit 98, and stores the teaching data in the storage unit 98. In step S64, the control device 90 operates the wafer transfer device 60 based on the teaching data stored in the storage unit 98 in step S62 to transfer the wafer W between the wafer boat 50 and the FOUP.

Further, the neural network generated in step S60 may be fed back to various data stored in the storage unit 98. In this way, the control device 90 may control the operation of the wafer transfer device 60 based on the optimum teaching data calculated by machine learning, and may autonomously control the transfer of the wafer W.

<<Utilization of Captured Image Data of Cameras 70 and 72>>

Figure 8:
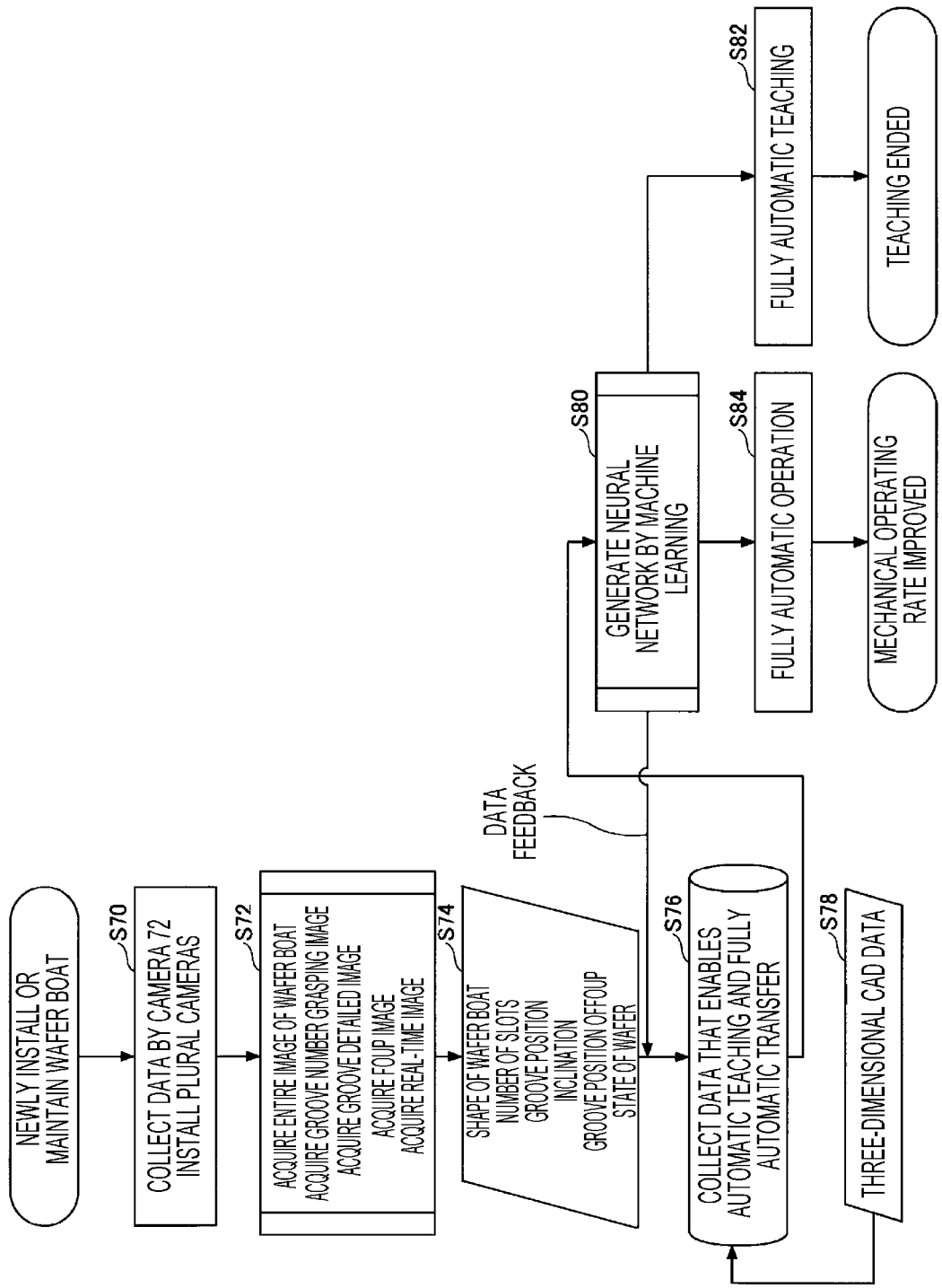
FIG. 8 is a flowchart of an example of processing utilizing the cameras 70 and 72.

The control device 90 performs a fully automatic teaching process, autonomous automatic transfer process, and maintenance execution prediction process of the wafer transfer device 60 based on the shapes of the wafer boat 50 and the FOUP which are detected by the procedure illustrated in, for example, FIG. 8. FIG. 8 is a flowchart of an example of processing utilizing the cameras 70 and 72.

In step S70, the control device 90 collects data by the cameras 70 and 72. For example, the control device 90 uses a polarizing plate to detect the polarized light (groove portion) due to the difference in the thickness of quartz of the wafer boat 50, thereby capturing the groove shape of the wafer boat 50. Further, the control device 90 captures the shapes of the wafer boat 50 and the FOUP in the visible light region. By installing a plurality of cameras 70 and 72, the shape of the wafer boat 50 may be grasped and the distance measurement accuracy may be improved. The cameras 70 and 72 may utilize a wide-angle lens.

In step S72, the control device 90 acquires the entire image of the wafer boat 50, the groove number grasping image, the groove detailed image, the FOUP image, and the real-time image from the data collected in step S70. The camera 72 is designed to be installed at a position where the operation of placing (putting) the wafer W held by the fork 63 on the wafer boat 50 and the operation of lifting (getting) the wafer W held by the wafer boat 50 by the fork 63 may be captured.

The camera 70 is designed to be installed at a position where the shape of the wafer boat 50, the state of the wafer boat 50, the change in the installation state of the wafer W (comparison at the time of loading/unloading), and the change in important parts may be captured. Further, the camera 70 is designed to be installed at a position where the position of the groove of the wafer boat 50, which starts an automatic teaching, may be detected with high accuracy. The position of the groove of the wafer boat 50 may be detected based on the captured image data of the camera 72, the three-dimensional measurement data, and the neural network data including past machine learning.

In step S74, the control device 90 performs an image processing on the entire image of the wafer boat 50, the groove number grasping image, the groove detailed image, the FOUP image, and the real-time image which are acquired in step S72, thereby measuring the shape of the wafer boat 50, the number of slots, the groove position, the inclination, the groove position of the FOUP, and the state of the wafer W. The state of the wafer W represents data such as the position of the wafer W, cracking, diagonal placement, double placement, spacing, and protrusion on the wafer boat 50.

In step S76, the control device 90 collects data that includes the data measured in step S74 and enables an automatic teaching and a fully automatic transfer, and stores the data in the storage unit 98. In step S78, the control device 90 may store the three-dimensional CAD data, which is an example of the design data, in the storage unit 98 as data that enables the automatic teaching and the fully automatic transfer.

The storage unit 98 stores data that enables the automatic teaching and the fully automatic transfer of the previous wafer boat 50 attached to the substrate processing apparatus 1, and data that enables the automatic teaching and the fully automatic transfer of the existing wafer boat 50 attached to the substrate processing apparatus 1.

In step S80, the control device 90 generates a neural network that calculates the optimum teaching data for wafer transfer by machine learning based on the data stored in the storage unit 98 that enables the automatic teaching and the fully automatic transfer.

In step S82, the control device 90 generates teaching data for all slots based on the data and the neural network that enable the automatic teaching and the fully automatic transfer stored in the storage unit 98, and stores the teaching data in the storage unit 98. In step S84, the control device 90 operates the wafer transfer device 60 based on the teaching data stored in the storage unit 98 in step S82 to transfer the wafer W between the wafer boat 50 and the FOUP.

Further, the neural network generated in step S80 may be fed back to various data stored in the storage unit 98. In this way, the control device 90 may control the operation of the wafer transfer device 60 based on the optimum teaching data calculated by machine learning, and may autonomously control the transfer of the wafer W.

<<Utilization of Optical Sensor>>

Figure 9:
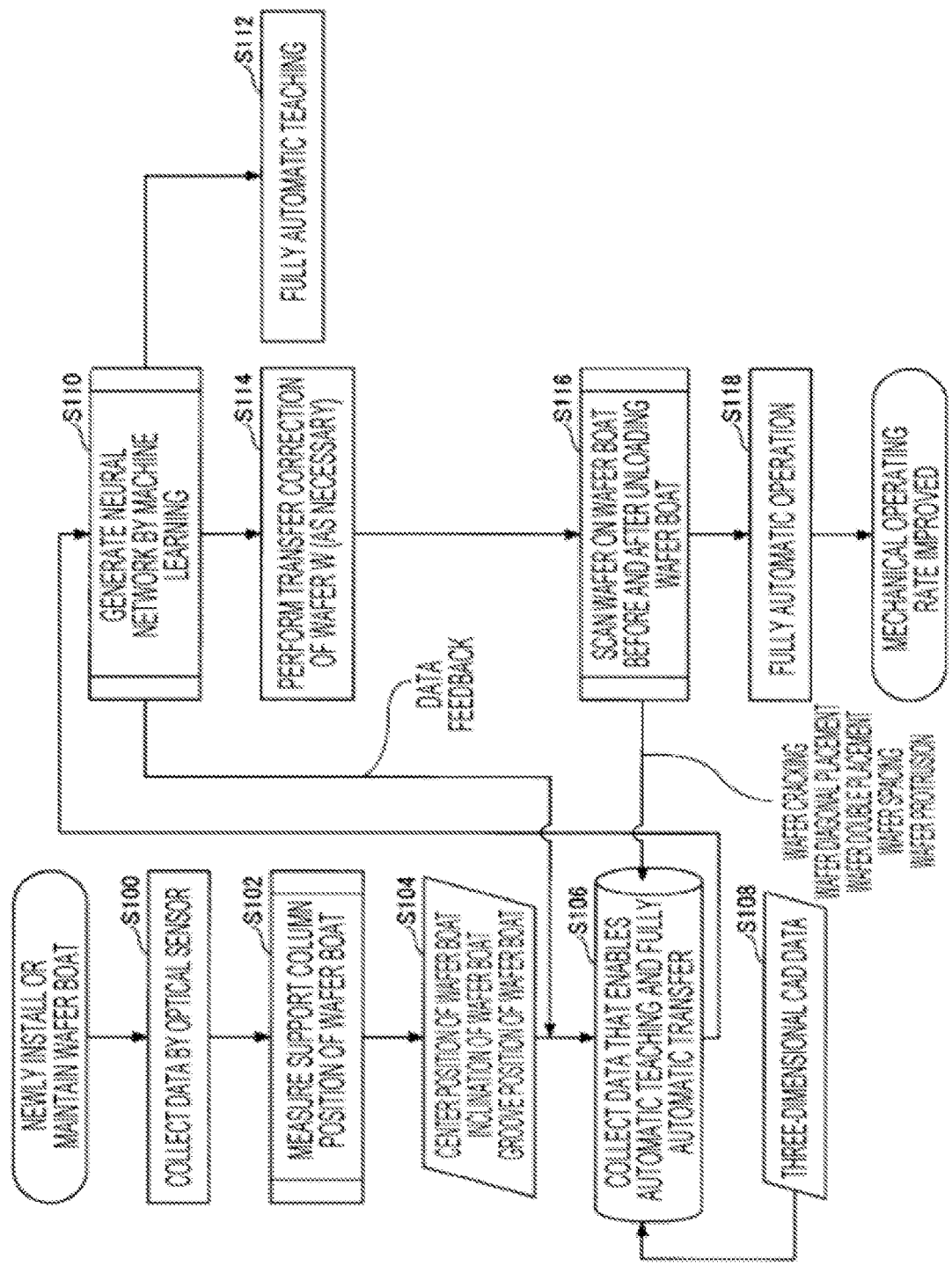
FIG. 9 is a flowchart of an example of processing utilizing an optical sensor.

The control device 90 may perform a fully automatic teaching process, autonomous automatic transfer process, and maintenance execution prediction process of the wafer transfer device 60 based on the shapes of the wafer boat 50 and the FOUP which are detected by the procedure illustrated in, for example, FIG. 9. FIG. 9 is a flowchart of an example of processing utilizing an optical sensor.

In step S100, the control device 90 collects data by the optical sensor. In step S102, the control device 90 measures a support column position of the wafer boat 50 from the data collected in step S100. In step S104, the control device 90 grasps a center position of the wafer boat 50 from the support column position of the wafer boat 50 measured in step S102. Further, the control device 90 grasps the inclination of the wafer boat 50 and the groove position from the data collected in step S100.

In step S106, the control device 90 collects data that includes the data grasped in step S104 and enables an automatic teaching and a fully automatic transfer, and stores the data in the storage unit 98. In step S108, the control device 90 may store the three-dimensional CAD data, which is an example of the design data, in the storage unit 98 as data that enables the automatic teaching and the fully automatic transfer.

In step S110, the control device 90 generates a neural network that calculates the optimum teaching data for wafer transfer by machine learning based on the data stored in the storage unit 98 that enables the automatic teaching and the fully automatic transfer.

In step S112, the control device 90 generates teaching data for all slots based on the data and the neural network that enable the automatic teaching and the fully automatic transfer stored in the storage unit 98, and stores the teaching data in the storage unit 98. In step S114, the control device 90 may perform a transfer correction of the wafer W as necessary.

In steps S116 and S118, the control device 90 operates the wafer transfer device 60 based on the teaching data stored in the storage unit 98 in step S112 to transfer the wafer W from the carrier C of the transfer source to the wafer boat 50 of the transfer destination. The control device 90 scans the wafer W on the wafer boat 50 before loading the wafer boat 50 into the heat treatment furnace 80 and after unloading the wafer boat 50 from the heat treatment furnace 80.

As a result, the control device 90 may measure data such as wafer cracking, wafer diagonal placement, wafer double placement, wafer spacing, and wafer protrusion, and in associated with the teaching data at that time, store such data in the storage unit 98 as data that enables the automatic teaching and the fully automatic transfer in step S106. Further, the neural network generated in step S110 may be fed back to various data stored in the storage unit 98. In this way, the control device 90 may control the operation of the wafer transfer device 60 based on the optimum teaching data calculated by machine learning, and may autonomously control the transfer of the wafer W.

<<Utilization of Three-Dimensional Image Data>>

Figure 10:
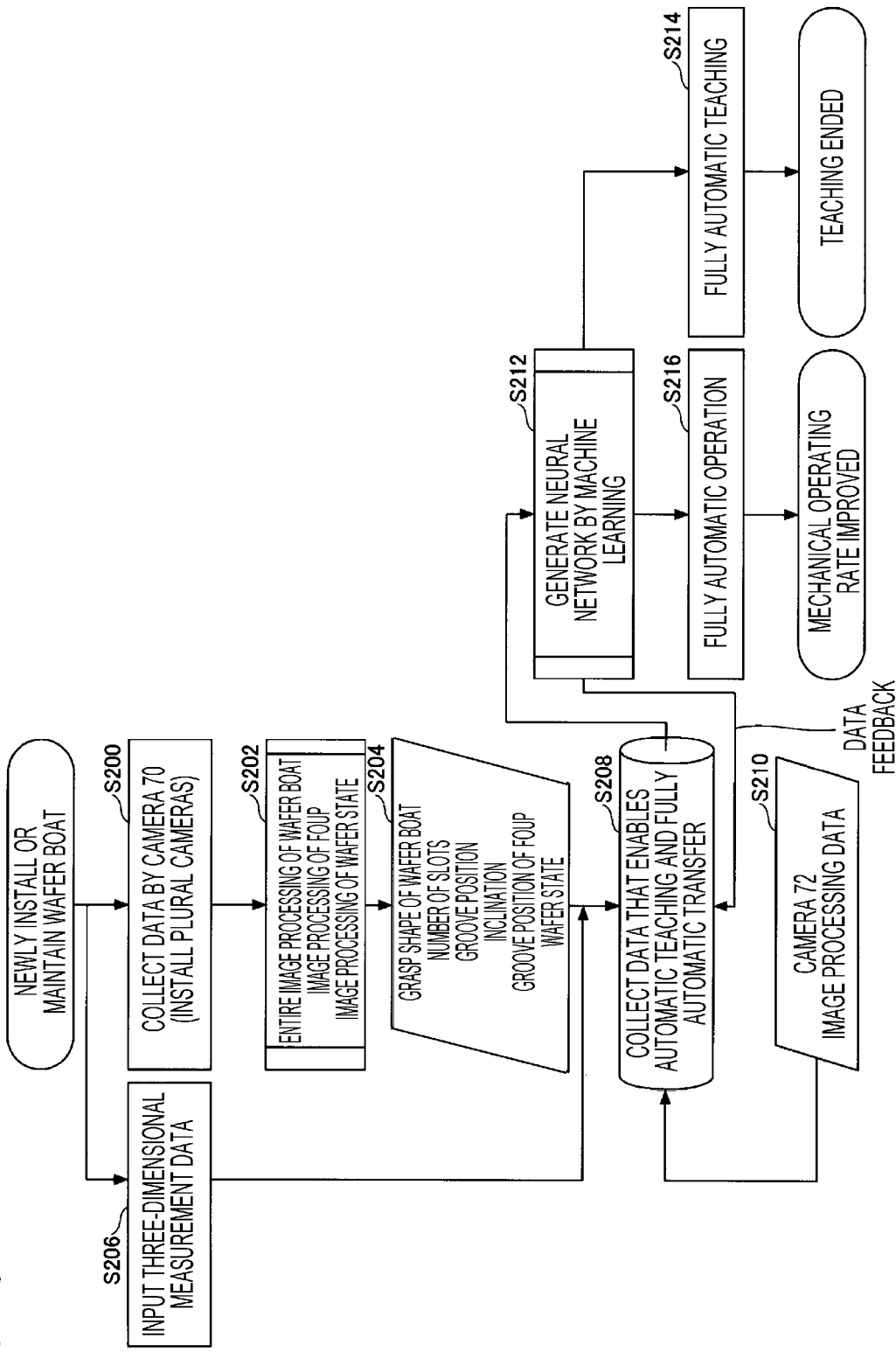
FIG. 10 is a flowchart of an example of processing utilizing captured image data of the camera 70.
Figure 11:
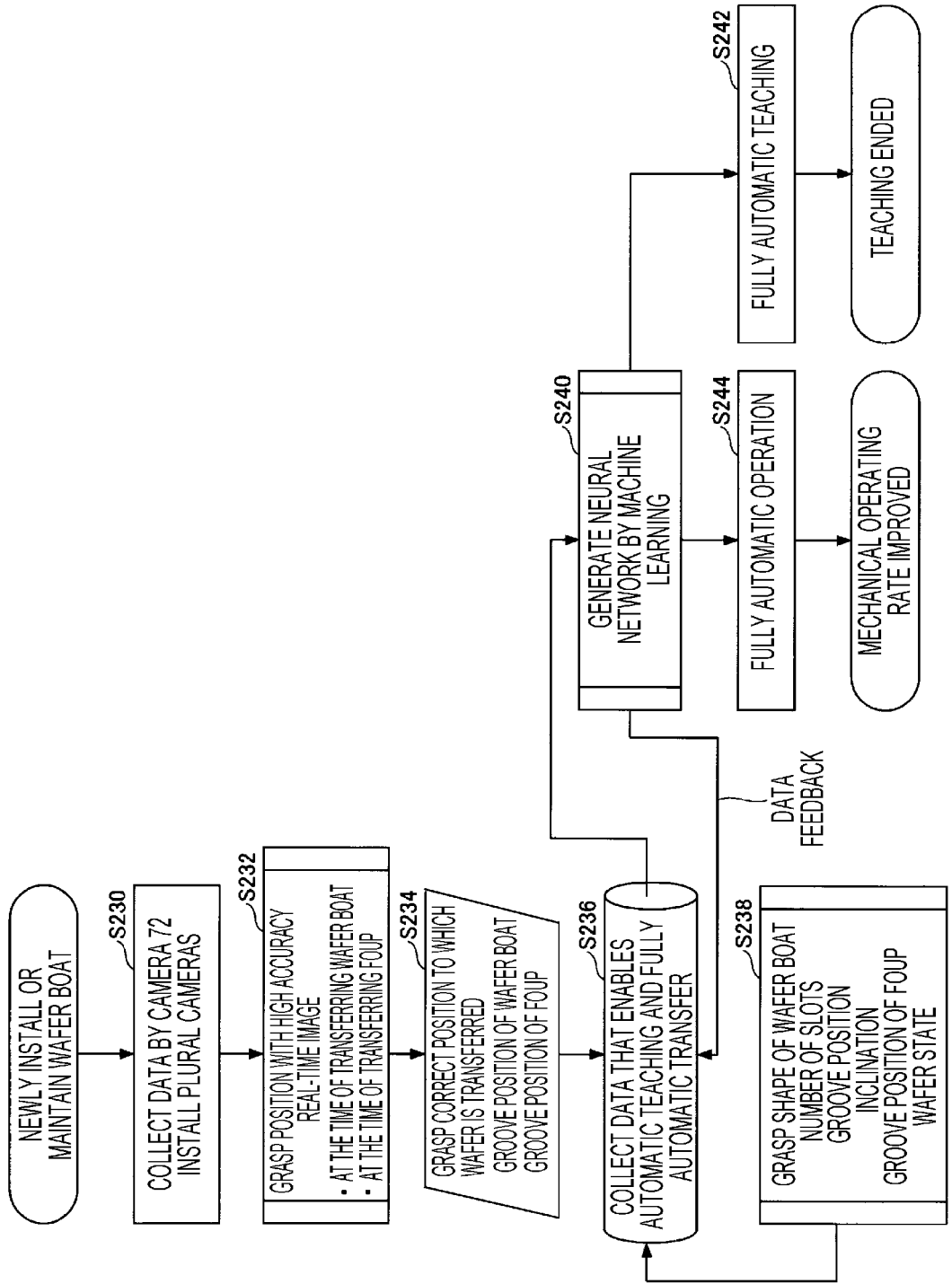
FIG. 11 is a flowchart of an example of processing utilizing captured image data of the camera 72.

The control device 90 performs a fully automatic teaching process, autonomous automatic transfer process, and maintenance execution prediction process of the wafer transfer device 60 by the procedure illustrated in, for example, FIGS. 10 and 11. FIG. 10 is a flowchart of an example of processing utilizing captured image data of the camera 70. FIG. 11 is a flowchart of an example of processing utilizing captured image data of the camera 72.

In the procedure illustrated in FIG. 10, a three-dimensional image data conversion processing of the shapes of the wafer boat 50 and the FOUP is performed based on the captured image data captured by the camera 70. In the present embodiment, the three-dimensional image data of the wafer boat 50 and the FOUP may be generated by such a three-dimensional image data conversion processing, and the change in the physical space may be reproduced in the virtual space by the so-called digital twin.

In the procedure illustrated in FIG. 11, the dimensions of the wafer W that may be reliably transferred (the clearance dimension between the wafer W and an object that transfers the wafer W, such as the wafer boat 50 and the FOUP) are measured in real time based on the captured image data captured by the camera 72. Changes in the real space such as the transfer of the wafer W between the wafer boat 50 and the FOUP by the wafer transfer device 60 may be implemented in the virtual space with real-time interlocking by the so-called digital twin.

Next, the processing of FIG. 10 will be described. In step S200, the control device 90 collects data by a plurality of cameras 70 installed in the wafer transfer region S2. In step S202, the control device 90 uses the data collected in step S200 and the three-dimensional CAD data to perform an entire image processing of the wafer boat 50, an image processing of the FOUP, and an image processing of the wafer state as described later. In step S204, the control device 90 determines the shape of the wafer boat 50, number of slots, groove position, inclination, groove position of the FOUP, and state of the wafer W by performing the entire image processing of the wafer boat 50, the image processing of the FOUP, and the image processing of the wafer state. In step S206, the three-dimensional measurement data of the wafer boat 50 is input to the control device 90.

In step S208, the control device 90 collects data that includes the data measured in step S204 and the three-dimensional measurement data input in step S206, and enables the automatic teaching and the fully automatic transfer, and stores the data in the storage unit 98. In step S210, the control device 90 may store the image processing data (image position information) of the camera 72 that may be acquired by the processing illustrated in FIG. 11 in the storage unit 98 as data that enables the automatic teaching and the fully automatic transfer.

The storage unit 98 stores data that enables the automatic teaching and the fully automatic transfer of the previous wafer boat 50 attached to the substrate processing apparatus 1, and data that enables the automatic teaching and the fully automatic transfer of the existing wafer boat 50 attached to the substrate processing apparatus 1.

In step S212, the control device 90 generates a neural network that calculates the optimum teaching data for wafer transfer by machine learning based on the data stored in the storage unit 98 that enables the automatic teaching and the fully automatic transfer.

In step S214, the control device 90 generates teaching data for all slots based on the data and the neural network that enable the automatic teaching and the fully automatic transfer stored in the storage unit 98, and stores the teaching data in the storage unit 98. In step S216, the control device 90 operates the wafer transfer device 60 based on the teaching data stored in the storage unit 98 to transfer the wafer W between the wafer boat 50 and the FOUP.

Further, the neural network generated in step S212 may be fed back to various data stored in the storage unit 98. In this way, the control device 90 may control the operation of the wafer transfer device 60 based on the optimum teaching data calculated by machine learning, and may autonomously control the transfer of the wafer W.

According to the processing illustrated in FIG. 10, by comparing the three-dimensional image data generated from the three-dimensional CAD data, which is an example of the design data, with the three-dimensional image data generated from the captured image data of the camera 70, it is possible to detect abnormalities such as an erroneous installation of components such as the wafer boat 50 (erroneous installation of the wafer boat 50), distortion or inclination of the wafer boat 50 occurring out of the permissible range, or missing installed parts.

Next, the processing of FIG. 11 will be described. In step S230, the control device 90 collects data by the camera 72. In step S232, the control device 90 grasps the position with high accuracy from the captured image data of the camera 72 when the wafer W is transferred to the wafer boat 50 (at the time of transferring the wafer boat) and when the wafer W is transferred to the FOUP (at the time of transferring the FOUP).

In step S234, the control device 90 grasps the position (groove position) of the wafer boat 50 to which the wafer W is transferred or the position (groove position) of the FOUP from the position that may be grasped with high accuracy in step S232.

In step S236, the control device 90 collects data that includes the data measured in step S234 and enables an automatic teaching and a fully automatic transfer, and stores the data in the storage unit 98. In step S238, the control device 90 may store the shape of the wafer boat 50, number of slots, groove position, inclination, the groove position of the FOUP, and the state of the wafer W, which may be acquired by the process illustrated in FIG. 10, in the storage unit 98 as data that enables the automatic teaching and the fully automatic transfer. The storage unit 98 stores data that enables the automatic teaching and the fully automatic transfer to the wafer transfer device 60.

In step S240, the control device 90 generates a neural network that calculates the optimum teaching data for wafer transfer by machine learning based on the data stored in the storage unit 98 that enables the automatic teaching and the fully automatic transfer.

In step S242, the control device 90 generates teaching data for all slots based on the data and the neural network that enable the automatic teaching and the fully automatic transfer stored in the storage unit 98, and stores the teaching data in the storage unit 98. In step S244, the control device 90 operates the wafer transfer device 60 based on the teaching data stored in the storage unit 98 to transfer the wafer W between the wafer boat 50 and the FOUP.

Further, the neural network generated in step S240 may be fed back to various data stored in the storage unit 98. In this way, the control device 90 may control the operation of the wafer transfer device 60 based on the optimum teaching data calculated by machine learning, and may autonomously control the transfer of the wafer W.

In the process illustrated in FIG. 11, monitoring other than the transfer of the wafer W may be performed. For example, the control device 90 may monitor the chuck state of the wafer W on the fork 63 and the misalignment of the wafer W from the captured image data of the camera 72. When the misalignment of the wafer W is within a permissible range, the control device 90 may correct the misalignment of the wafer W by re-getting and re-putting the wafer W after putting the wafer W to the wafer boat 50.

Further, the control device 90 may issue a preventive maintenance notification by monitoring the state of the wafer W on the fork 63. The control device 90 may capture a physical change of the substrate processing apparatus 1 (e.g., a change in shape due to dry cleaning, a structural change such as distortion, inclination, or omission of components) and give a preventive maintenance notification.

Figure 12:
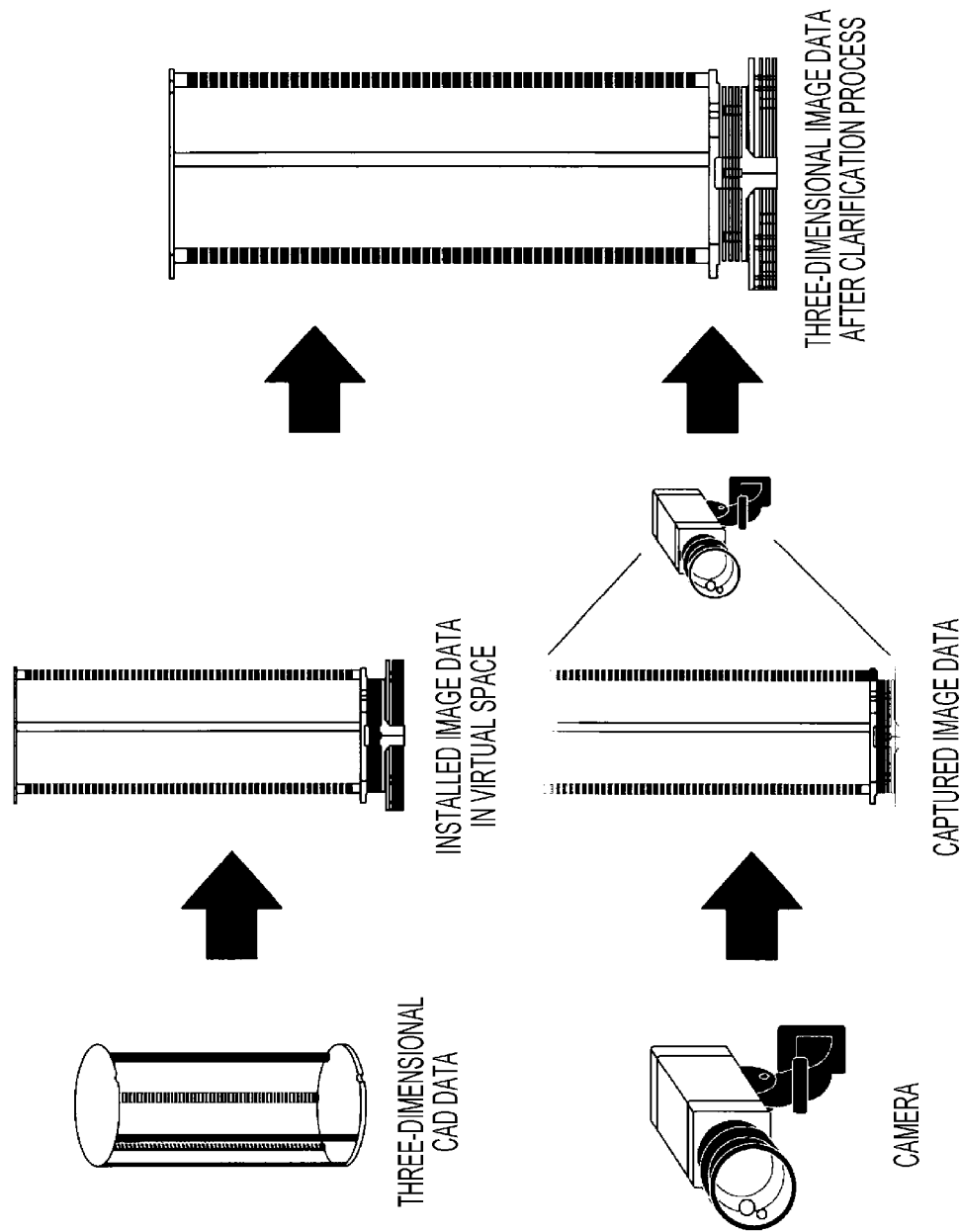
FIG. 12 is a diagram illustrating an example of image processing in step S202.
Figure 13:
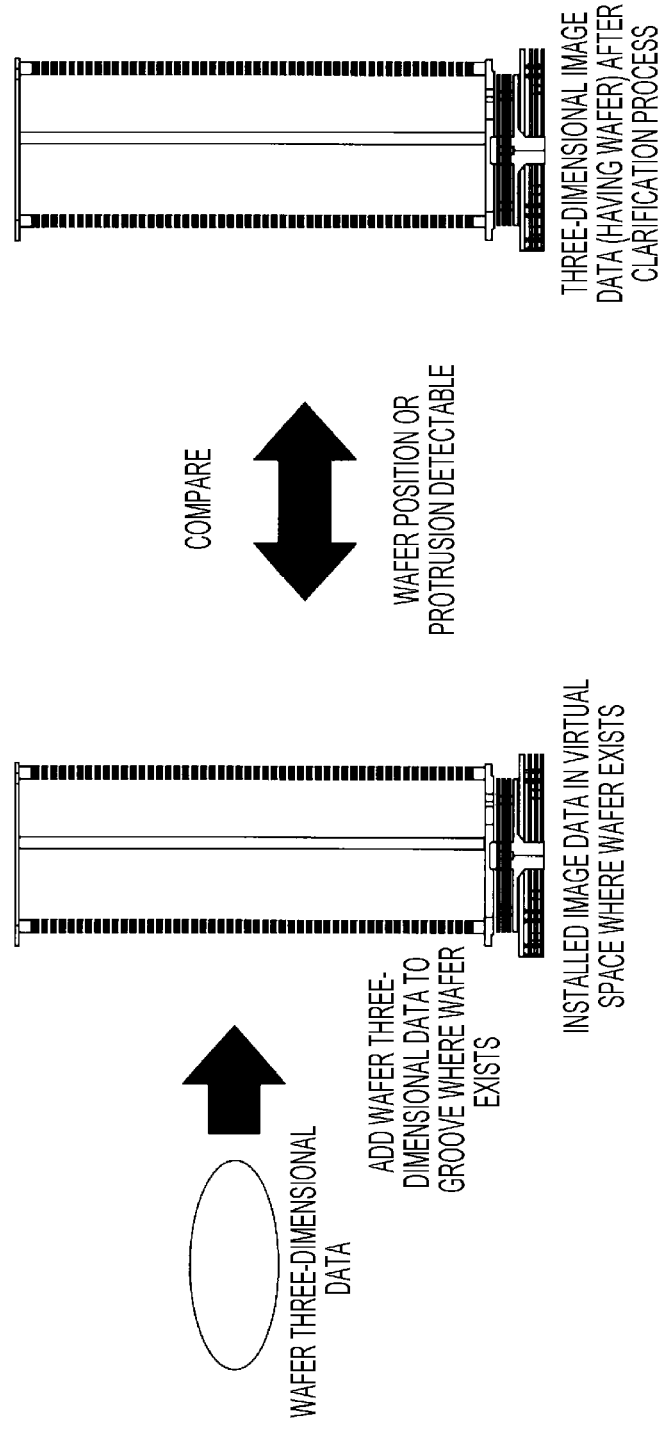
FIG. 13 is a diagram illustrating an example of image processing in step S202.

The image processing in step S202 is performed, for example, as illustrated in FIGS. 12 and 13. FIGS. 12 and 13 are diagrams illustrating an example of image processing in step S202. As illustrated in FIG. 12, the control device 90 performs a process of sharpening the captured image data of the cameras 70 and 72 by deep learning based on the three-dimensional image data (installed image data) in the virtual space generated from the three-dimensional CAD data. Further, the captured image data of the cameras 70 and 72 is used for various processes as reference data of the digital twin every time the wafer boat 50 is replaced.

As illustrated in FIG. 13, the control device 90 uses the three-dimensional data of the wafer W to add the three-dimensional data of the wafer W to the groove position where the wafer W exists (is mounted), so that the three-dimensional data (installed image data) in the virtual space where the wafer W exists is generated. It is possible to detect the position and protrusion of the wafer W by comparing the installed image data of the wafer boat 50 generated in this way with the three-dimensional image data of the wafer boat 50 with the wafer W after the sharpening process illustrated in FIG. 12.

Figure 14:
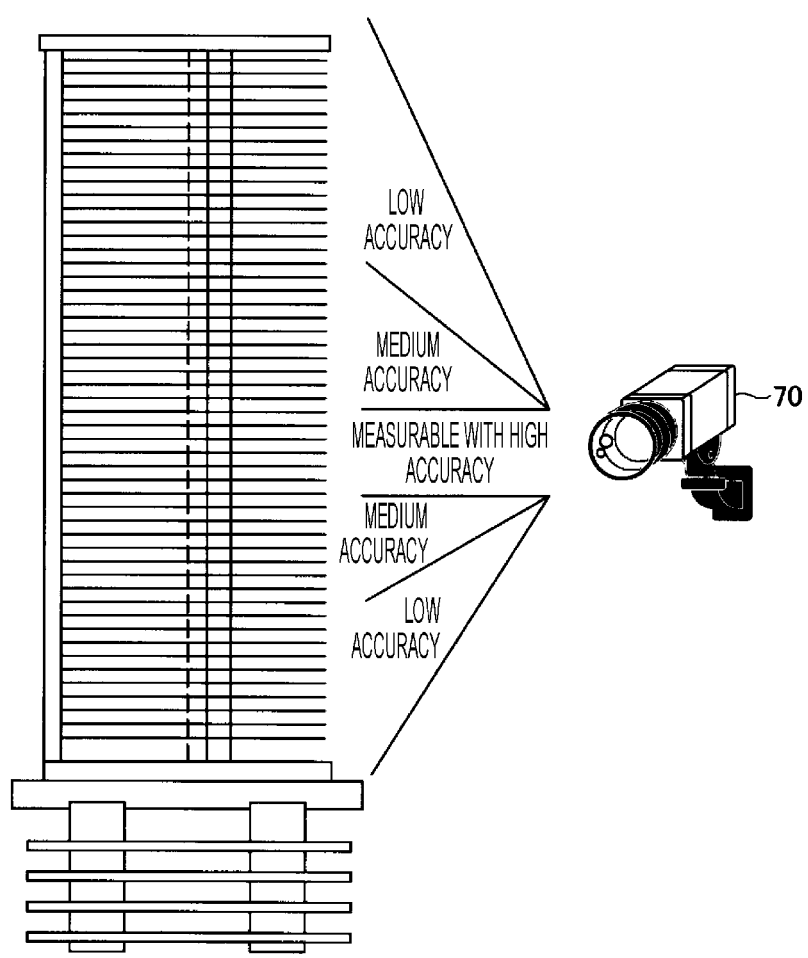
FIG. 14 is a diagram illustrating an example of the accuracy of captured image data of the camera 70.

FIG. 14 is a diagram illustrating an example of the accuracy of captured image data of the camera 70. As illustrated in FIG. 14, the region captured by the camera 70 is divided into a high-precision measurable region, a medium-precision region, and a low-precision region. In the high-precision measurement region, the groove of the wafer boat 50 may be measured with high accuracy such as 100 μm or less. In the medium-precision region, the groove of the wafer boat 50 may be measured with medium accuracy such as 1 mm or less. In the low accuracy region, the groove of the wafer boat 50 may be discriminated.

For example, the control device 90 may determine the number of grooves of the wafer boat 50 based on the data in the low accuracy region, and may determine the approximate shape, so that it is possible to determine the installation error of the wafer boat 50. In addition, the control device 90 may determine the correct installation accuracy of the wafer boat 50 installation based on the data in the high-precision measurement region and the medium-precision region, and provide the correct installation position information when the wafer boat 50 is not installed correctly.

Further, when the wafer W may be automatically transferred to the designated groove of the wafer boat 50 with an accuracy of 100 μm, new teaching data may be automatically generated from the past neural network and the shape of the newly installed wafer boat 50.

The control device 90 acquires the captured image data of the camera 70 before charging the wafer W to the wafer boat 50 and before discharging the wafer W from the wafer boat 50. Before charging the wafer W, it is confirmed whether there is a mutation in the groove position of the wafer boat 50 based on the reference data of the wafer boat 50. When it is confirmed that there is a mutation, the teaching data is automatically corrected based on the mutation amount.

Before the wafer W is discharged, the captured image data that is acquired before loading the wafer boat 50 after the transfer of the wafer W is completed is compared with the captured image data of the wafer boat 50 before the wafer W is discharged. As a result, when there is a mutation, the teaching data is automatically corrected based on the mutation amount. Further, when an impermissible mutation amount is detected, the control device 90 may have an automatic alert function of displaying an alert on the display device 906 to notify the user. With this automatic alert function, an appropriate preventive maintenance and a periodic adjustment by maintenance personnel may be performed, and the operating rate of the substrate processing apparatus 1 may be improved.

Figure 15:
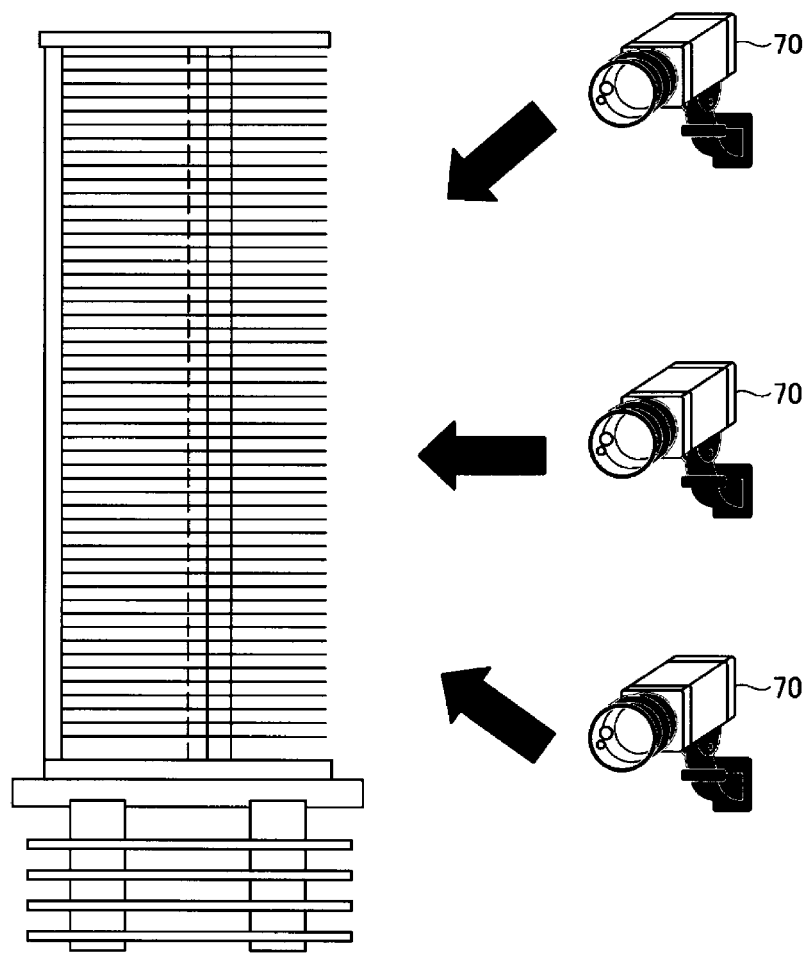
FIG. 15 is a diagram illustrating an example of an installation position and a capturing direction of the camera 70.

Further, the installation position and capturing direction of the camera 70 are not limited to the example illustrated in FIG. 14, and may be, for example, the installation position and capturing direction of the camera 70 illustrated in FIG. 15. For example, according to the captured image data of the wafer boat 50 by the camera 70 whose capturing direction is oblique as illustrated in FIG. 15, it becomes easy to grasp the protrusion of the wafer W, which is difficult to grasp from the captured image data of the wafer boat 50 by the camera 70 whose capturing direction is horizontal.

Figure 16:
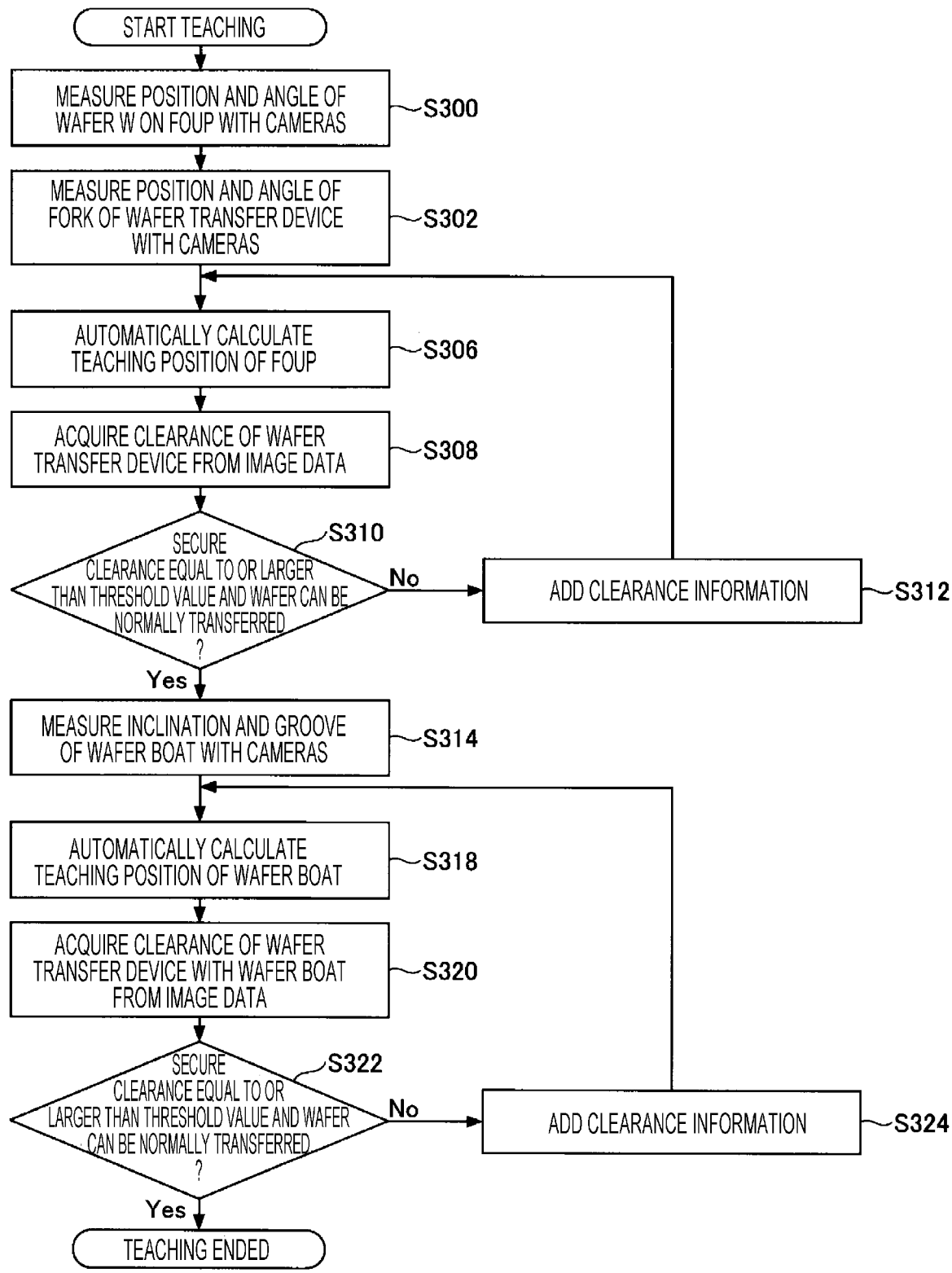
FIG. 16 is a flowchart of an example of automatic teaching processing.

The operation of automatic teaching in step S214 is performed, for example, as illustrated in FIG. 16. FIG. 16 is a flowchart of an example of the automatic teaching process. In step S300, the control device 90 measures the position and angle of the wafer W on the FOUP with the cameras 70 and 72. Further, in step S302, the control device 90 measures the position and angle of the fork 63 of the wafer transfer device 60 with the cameras 70 and 72.

In step S306, the control device 90 automatically calculates the teaching position of the FOUP from the measurement results of steps S300 and S302. In step S308, the control device 90 acquires the clearance dimension of the wafer transfer device 60 by measuring the captured image data captured by the camera 72. In step S310, the control device 90 secures a clearance dimension equal to or larger than a threshold value and determines whether the wafer W may be normally transferred.

When it is determined that the clearance dimension equal to or larger than the threshold value may not be secured, the control device 90 adds the clearance dimension information to the data required for the process of automatically calculating the teaching position of the FOUP in step S306 in step S312. Then, the control device 90 returns to step S306 and continues the process.

When it is determined that the clearance dimension equal to or larger than the threshold value may be secured, the control device 90 measures the inclination and the groove of the wafer boat 50 with the cameras 70 and 72 in step S314. In step S318, the control device 90 automatically calculates the teaching position of the wafer boat 50 from the measurement result of step S314. In step S320, the control device 90 acquires the clearance dimension of the wafer transfer device 60 with the wafer boat 50 by measuring the captured image data captured by the camera 72.

In step S322, the control device 90 secures a clearance dimension equal to or larger than the threshold value and determines whether the wafer W may be normally transferred. When it is determined that the clearance dimension equal to or larger than the threshold value may not be secured, the control device 90 adds the clearance dimension information to the data required for the process of automatically calculating the teaching position of the wafer boat 50 in step S318 in step S324. Then, the control device 90 returns to step S318 and continues the process. When it is determined that the clearance dimension equal to or larger than the threshold value may be secured, the control device 90 ends the automatic teaching process of FIG. 16.

Figure 17:
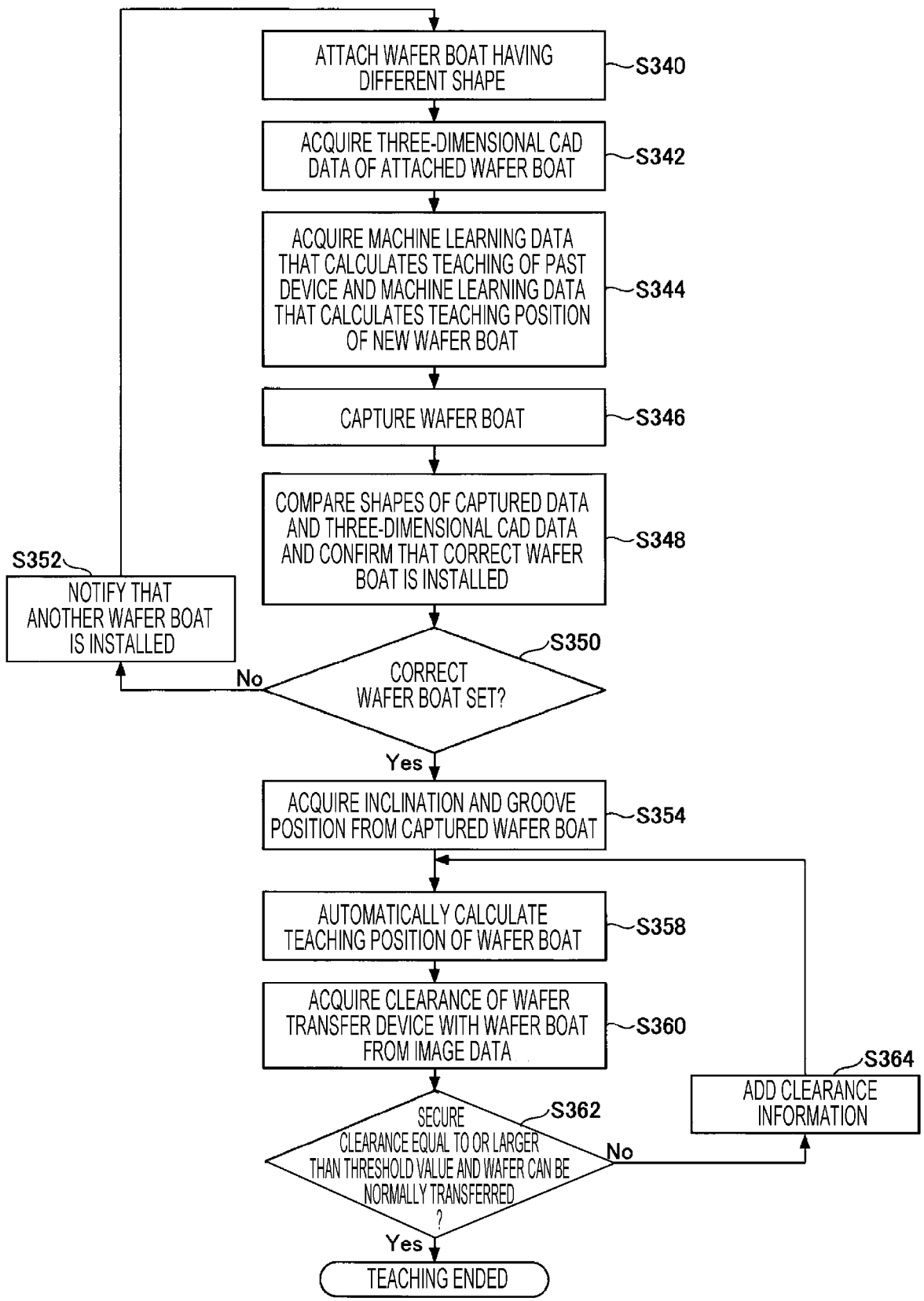
FIG. 17 is a flowchart of an example of automatic teaching processing.

Further, when the wafer boat 50 is replaced, the control device 90 performs an automatic teaching operation as illustrated in, for example, FIG. 17. FIG. 17 is a flowchart of an example of the automatic teaching process. In step S340, a wafer boat 50 having a different shape is attached. Further, in step S342, the three-dimensional CAD data of the attached wafer boat 50 is acquired.

In step S344, the control device 90 acquires the past machine learning data and the machine learning data for automatically calculating the teaching position of the wafer boat 50 attached in step S340. The machine learning data for automatically calculating the teaching position is acquired from multiple substrate processing apparatuses 1 of the same type so as to cope with various changes.

Therefore, even when the wafer boat 50 having a different shape is attached, it is possible to cope with the automatic calculation of the teaching position by the three-dimensional CAD data of the attached wafer boat 50 and the machine learning algorithm.

In step S346, the cameras 70 and 72 capture the wafer boat 50. The control device 90 compares the shape of the wafer boat 50 of the captured image data with the shape of the wafer boat 50 of the three-dimensional image data generated by the three-dimensional CAD data in step S348, thereby confirming whether the correct wafer boat 50 is installed in step S350.

When it is confirmed that the correct wafer boat 50 is not installed, the control device 90 notifies the maintenance personnel in step S352 that the wafer boat 50 having a different shape is installed by an automatic alert function. As a result, maintenance personnel may recognize that the wafer boat 50 having a different shape is attached, and may reattach the wafer boat 50 in step S340.

When it is confirmed that the correct wafer boat 50 is installed, the control device 90 acquires the inclination and groove position of the wafer boat 50 from the captured image data in step S354 by measurement. In step S358, the control device 90 automatically calculates the teaching position of the wafer boat 50 from the measurement result of step S354. In step S360, the control device 90 acquires the clearance dimension of the wafer transfer device 60 with the wafer boat 50 by measuring the captured image data captured by the camera 72.

In step S362, the control device 90 secures a clearance dimension equal to or larger than the threshold value and determines whether the wafer W may be normally transferred. When it is determined that the clearance dimension equal to or larger than the threshold value may not be secured, the control device 90 adds the clearance dimension information to the data required for the process of automatically calculating the teaching position of the wafer boat 50 in step S358 in step S364. Then, the control device 90 returns to step S358 and continues the process. When it is determined that the clearance dimension equal to or larger than the threshold value may be secured, the control device 90 ends the automatic teaching process of FIG. 17.

In the above embodiment, a so-called ladder boat has been described as an example in which a plurality of columns is provided between a top plate and a bottom plate which are vertically opposed to each other, a plurality of grooves is formed on the inner side surface of each column, and the peripheral edge of the wafer W is inserted into the grooves and supported. However, the present disclosure is not limited thereto. The present disclosure may also be applied to, for example, a so-called ring boat in which a plurality of columns is provided between a top plate and a bottom plate which are vertically opposed to each other, a ring member having a flat support surface is provided on the plurality of columns, and the wafer W is supported on the support surface of the ring member. The ring boat is an example of a boat shape that is difficult to cope with in a fork scanning.

In the above embodiment, the carrier C and the wafer boat 50 are examples of the transfer source object and the transfer destination object. The wafer transfer device 60 is an example of a transfer device. The wafer W is an example of a substrate.

According to the present disclosure, it is possible to automate the teaching of the substrate transfer device.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A teaching method for a transfer device that transfers a substrate between a transfer source object and a transfer destination object, the teaching method comprising:

generating, by a controller, three-dimensional image data of a shape of the transfer source object on which the substrate is mounted, a shape of the transfer destination object to which the substrate is transferred from the transfer source object via the transfer device, and a state of the substrate in a virtual space based on captured image data of the transfer source object, the transfer destination object, and the substrate captured by an image sensor, and based on design data including three-dimensional CAD data of the transfer source object, the transfer destination object, and the substrate, the transfer device being provided between the transfer source object and the transfer destination object in a horizontal direction; and teaching, by the controller, the transfer device based on the three-dimensional image data so that the substrate is transferred between the transfer source object and the transfer destination object via the transfer device without colliding with the transfer source object and the transfer destination object, wherein the generating of the three-dimensional image data includes correcting a shape of at least one of the transfer source object, the transfer destination object and the substrate based on a difference between the captured image data and the design data.

2. The teaching method according to claim 1, wherein the generating of the three-dimensional image data includes generating the three-dimensional image data capable of grasping a shape of a mounting position where the transfer source object mounts the substrate and a shape of a mounting position where the transfer destination object mounts the substrate as the shapes of the transfer source object and the transfer destination object.

3. The teaching method according to claim 2, wherein the teaching of the transfer device includes adjusting a teaching position to be performed on the transfer device based on a difference between the three-dimensional image data generated from the image data and the three-dimensional image data generated from the design data.

4. The teaching method according to claim 3, wherein the teaching of the transfer device includes detecting misplacement, distortion, or inclination of the transfer source object or the transfer destination object based on a difference between the three-dimensional image data generated from the image data and the three-dimensional image data generated from the design data.

5. The teaching method according to claim 4, wherein the generating of the three-dimensional image data includes sharpening the shape of the transfer source object, the shape of the transfer destination object, and the shape of the substrate displayed by the three-dimensional image data by using a model in which a plurality of image data pieces obtained by capturing the shape of the transfer source object, the shape of the transfer destination object, and a state of the substrate is deep-learned.

6. The teaching method according to claim 5, wherein the teaching of the transfer device including determining whether a clearance dimension between the transfer source object or the transfer destination object and the substrate is within a predetermined range, and when the clearance dimension is not within the predetermined range, performing a preventive maintenance notification.

7. The teaching method according to claim 6, wherein the image sensor includes a first image sensor configured to capture the transfer source object, the transfer destination object, and the substrate, and a second image sensor provided in the transfer device that transfers the substrate and capable of changing a position and a capturing direction.

8. The teaching method according to claim 1, wherein the teaching of the transfer device includes adjusting a teaching position to be performed on the transfer device based on a difference between the three-dimensional image data generated from the image data and the three-dimensional image data generated from the design data.

9. The teaching method according to claim 1, wherein the teaching of the transfer device includes detecting misplacement, distortion, or inclination of the transfer source object or transfer destination object based on a difference between the three-dimensional image data generated from the image data and the three-dimensional image data generated from the design data.

10. The teaching method according to claim 1, wherein the generating of the three-dimensional image data includes sharpening the shape of the transfer source object, the shape of the transfer destination object, and the shape of the substrate displayed by the three-dimensional image data by using a model in which a plurality of image data pieces obtained by capturing the shape of the transfer source object, the shape of the transfer destination object, and the state of the substrate is deep-learned.

11. The teaching method according to claim 1, wherein the teaching of the transfer device includes determining whether a clearance dimension between the transfer source object or the transfer destination object and the substrate is within a predetermined range, and when the clearance dimension is not within the predetermined range, performing a preventive maintenance notification.

12. The teaching method according to claim 1, wherein the image sensor includes a first image sensor configured to capture the transfer source object, the transfer destination object, and the substrate, and a second image sensor provided in the transfer device that transfers the substrate and capable of changing a position and a capturing direction.

13. A transfer system comprising:
a transfer source object on which a substrate is mounted;
a transfer destination object to which the substrate is transferred from the transfer source object;
a transfer device provided between the transfer source object and the transfer destination object in a horizontal direction, and including a moving body and a fork connected to the moving body,
a controller configured to control an overall operation of the transfer source object, the transfer destination object and the transfer device,
wherein the controller is configured to:
transfer the substrate between the transfer source object and the transfer destination object via the fork of transfer device;
generate three-dimensional image data of a shape of the transfer source object, a shape of the transfer destination object, and a state of the substrate in a virtual space based on image data of the transfer source object, the transfer destination object, and the substrate captured by a capturing unit, and based on design data including three-dimensional CAD data of the transfer source object, the transfer destination object, and the substrate; and
teach the transfer device based on the three-dimensional image data so that the substrate is transferred between the transfer source object and the transfer destination object via the transfer device and using the fork of transfer device without colliding with the transfer source object and the transfer destination object,
wherein when the controller generates the three-dimensional image data, a shape of at least one of the transfer source object, the transfer destination object and the substrate is corrected based on a difference between the captured image data and the design data.

14. A non-transitory computer-readable recording medium having stored therein a program that causes a computer to execute a process on a transfer device transferring a substrate between a transfer source object and a transfer destination object, the process comprising:
generating, by the computer, three-dimensional image data of a shape of the transfer source object on which the substrate is mounted, a shape of the transfer destination object to which the substrate is transferred from the transfer source object via the transfer device, and a state of the substrate in a virtual space based on captured image data of the transfer source object, the transfer destination object, and the substrate captured by an image sensor, and based on design data including three-dimensional CAD data of the transfer source object, the transfer destination object, and the substrate, the transfer device being provided between the transfer source object and the transfer destination object in a horizontal direction; and
teaching, by the computer, the transfer device based on the three-dimensional image data so that the substrate is transferred between the transfer source object and the transfer destination object via the transfer device without colliding with the transfer source object and the transfer destination object,
wherein the generating of the three-dimensional image data includes correcting a shape of at least one of the transfer source object, the transfer destination object and the substrate based on a difference between the captured image data and the design data.

15. The teaching method according to claim 1, wherein the teaching of the transfer device includes comparing the three-dimensional image data generated from the image data with the three-dimensional image data generated from the design data.

16. The transfer system according to claim 13, wherein the controller is further configured to compare the three-dimensional image data generated from the image data with the three-dimensional image data generated from the design data when the transfer device is taught.

17. The non-transitory computer-readable recording medium according to claim 14, wherein the teaching of the transfer device includes comparing the three-dimensional image data generated from the image data with the three-dimensional image data generated from the design data.

* * * * *